United States Patent
Sun et al.

(10) Patent No.: US 11,950,175 B2
(45) Date of Patent: Apr. 2, 2024

(54) COMMUNICATION METHOD AND COMMUNICATIONS APPARATUS

(71) Applicant: HUAWEI TECHNOLOGIES CO., LTD., Guangdong (CN)

(72) Inventors: Haiyang Sun, Beijing (CN); Chunshan Xiong, Shenzhen (CN); Shiyong Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/987,550

(22) Filed: Nov. 15, 2022

(65) Prior Publication Data

US 2023/0076340 A1 Mar. 9, 2023

Related U.S. Application Data

(63) Continuation of application No. 17/081,634, filed on Oct. 27, 2020, now Pat. No. 11,533,670, which is a (Continued)

(30) Foreign Application Priority Data

Apr. 28, 2018 (CN) .......................... 201810402954.3

(51) Int. Cl.
*H04L 65/1069* (2022.01)
*H04W 8/20* (2009.01)
*H04W 40/02* (2009.01)

(52) U.S. Cl.
CPC ............. *H04W 40/02* (2013.01); *H04W 8/20* (2013.01)

(58) Field of Classification Search
None
See application file for complete search history.

(56) References Cited

U.S. PATENT DOCUMENTS 11,736,981 B2 * 8/2023 Shen ................ H04W 28/0268
370/329
2017/0359749 A1 12/2017 Dao
(Continued)

FOREIGN PATENT DOCUMENTS

| CN | 107294737 | 10/2017 |
| CN | 107690149 | 2/2018 |

(Continued)

OTHER PUBLICATIONS

Extended European Search Report in European Application No. 19792262.8, dated May 12, 2021, 11 pages.
Huawei (Rapporteur), "TS 23.50x: Moving remaining sections from 23.501 Annex A into new TS," SA WG2 Meeting #122E e-meeting, Sep. 11-15, 2017, S2-176776, Elbonia, 12 pages.
(Continued)

*Primary Examiner* — Gary Lafontant
(74) *Attorney, Agent, or Firm* — Fish & Richardson P.C.

(57) ABSTRACT

Example communication methods and communications apparatuses are provided which verify a user equipment route selection policy (URSP) used by a terminal apparatus. The communication method includes obtaining information about a first application of at least one packet data unit (PDU) session, where the information about the first application is determined based on a first URSP. The information about the first application is sent to a second network element, where the information about the first application is used to verify whether information about a second application of the at least one PDU session matches the information about the first application, where the information about the second application is information about an application to which a data packet in the at least one PDU session belongs.

16 Claims, 15 Drawing Sheets

Related U.S. Application Data continuation of application No. PCT/CN2019/083743, filed on Apr. 22, 2019.

(56) References Cited

U.S. PATENT DOCUMENTS

| | | | |
|---|---|---|---|
| 2019/0281492 A1* | 9/2019 | Hans | H04L 47/2475 |
| 2020/0053803 A1 | 2/2020 | Youn et al. | |
| 2021/0152615 A1* | 5/2021 | Karampatsis | H04W 40/22 |

FOREIGN PATENT DOCUMENTS

| | | |
|---|---|---|
| CN | 107690161 | 2/2018 |
| EP | 3288226 | 2/2018 |
| WO | 2018066799 | 4/2018 |

OTHER PUBLICATIONS

Office Action issued in Chinese Application No. 201810402954.3 dated Mar. 26, 2020, 9 pages (with English translation).
PCT International Search Report and Written Opinion issued in International Application No. PCT/CN2019/083743 dated Jun. 28, 2019, 16 pages (with English translation).
3GPP TS 23.503 V15.1.0, "3rd Generation Partnership Project; Technical Specification Group Services and System Aspects; Policy and Charging Control Framework for the 5G System; Stage 2 (Release 15)," Mar. 2018, 65 pages.
3GPP TS 23.502 V15.1.0, "3rd Generation Partnership Project; Technical Specification Group Services and System Aspects; Procedures for the 5G System; Stage 2 (Release 15)," Mar. 2018, 285 pages.

* cited by examiner

COMMUNICATION METHOD AND COMMUNICATIONS APPARATUS

CROSS-REFERENCE TO RELATED APPLICATIONS

This application is a continuation of U.S. patent application Ser. No. 17/081,634, filed on Oct. 27, 2020, which is a continuation of International Application No. PCT/CN2019/083743, filed on Apr. 22, 2019, which claims priority to Chinese Patent Application No. 201810402954.3, filed on Apr. 28, 2018. All of the afore-mentioned patent applications are hereby incorporated by reference in their entireties.

TECHNICAL FIELD

This application relates to the field of mobile communications technologies, and in particular, to a communication method and a communications apparatus.

BACKGROUND

In a fifth-generation mobile communications technology (5G), policy information related to user equipment (UE), that is, a user equipment route selection policy (URSP), is introduced, and a terminal apparatus serves as an executor of the policy, and selects an appropriate packet data unit (PDU) session for an uplink service flow. To be specific, some services have specific requirements on a data network name (DNN), single network slice selection assistance information (S-NSSAI), a session and service continuity SSC) mode, and the like of a used PDU session.

When the URSP is actually used, a URSP used by the terminal apparatus may be different from a URSP delivered by a network side, that is, the URSP used by the terminal apparatus is incorrect. The URSP may be delivered by a policy control function (PCF) used for access and mobility management (AM) policy control. For example, when the terminal apparatus initially enters a network, if the terminal apparatus fails to obtain a URSP of the network, or the terminal apparatus maliciously uses a PDU session with a relatively good characteristic, or an internal algorithm of the terminal apparatus is incorrect, the URSP used by the terminal apparatus may be different from the URSP delivered by the network side. This may cause an error in the PDU session.

SUMMARY

Embodiments of this application provide a communication method and a communications apparatus, to verify a URSP used by a terminal apparatus.

A first aspect provides a first communication method. The method may be performed by a first communications apparatus. The first communications apparatus is, for example, an SM-PCF or a chip disposed in an SM-PCF, or the first communications apparatus is, for example, an AMF or a chip disposed in an AMF, or the first communications apparatus is, for example, a UDM or a chip disposed in a UDM. The method includes: obtaining information about a first application of at least one packet data unit PDU session, where the information about the first application is determined based on a first user equipment route selection policy URSP; and sending the information about the first application to a second network element, where the information about the first application is used to verify whether information about a second application of the at least one PDU session matches the information about the first application, and the information about the second application is information about an application to which a data packet in the at least one PDU session belongs.

In this embodiment of this application, the first communications apparatus may obtain the information about the first application, and send the information about the first application to the second network element, so that the second network element may verify, based on the information about the first application, whether the information about the second application of the at least one PDU session matches the information about the first application, in other words, verify whether a URSP used by a terminal apparatus is consistent with a URSP on a network side, to provide an implementation mechanism for verifying correctness of the URSP of the terminal apparatus, and ensure a normal PDU session.

In a possible design, the obtaining information about a first application of at least one PDU session includes: sending first request information to a first network element, where the first request information is used to request to obtain the information about the first application, and receiving the information about the first application or sending first request information to a first network element, where the first request information is used to request to obtain the first URSP, receiving the first URSP, and obtaining, based on the first URSP, the information about the first application.

In this embodiment of this application, the first communications apparatus may obtain the information about the first application by sending the first request information to the first network element. The first request information may be used to request the first URSP, or may be used to request to obtain the information about the first application. If the first request information is used to request to obtain the first URSP, the communications apparatus may obtain, based on the first URSP, the information about the first application. This manner is relatively flexible.

In a possible design, the first request information includes identification information of a first PDU session, and the at least one PDU session is the first PDU session.

In this embodiment of this application, the first request information may request information about first applications of a plurality of PDU sessions, or URSPs corresponding to a plurality of PDU sessions, or the first request information may request information about a first application of a particular PDU session, or a URSP corresponding to a PDU session. In other words, there may be one or more PDU sessions in the at least one PDU session, to meet different requirements. If information about a first application of a PDU session or a URSP corresponding to a PDU session is requested, only identification information of the corresponding PDU session needs to be carried in the first request information. This manner is relatively simple.

A second aspect provides a second communication method. The method may be performed by a second communications apparatus. The second communications apparatus is, for example, an SMF or a chip disposed in an SMF, or the second communications apparatus is, for example, a UPF or a chip disposed in a UPF. The method includes: receiving information about a first application of at least one PDU session, where the information about the first application is determined based on a first URSP; determining whether information about a second application of the at least one PDU session matches the information about the first application, where the information about the second application is information about an application to which a data packet in the at least one PDU session belongs; and sending second request information to a first network element when it is determined that the information about the second application does not match the information about the first application, where the second request information is used to request the first network element to deliver the first URSP.

In this embodiment of this application, the second communications apparatus may verify whether the information about the second application of the at least one PDU session matches the information about the first application, in other words, verify whether a URSP used by a terminal apparatus is consistent with a URSP on a network side, to provide an implementation mechanism for verifying correctness of the URSP of the terminal apparatus, and ensure a normal PDU session. In addition, if determining that the URSP used by the terminal apparatus is inconsistent with the URSP on the network side, the second communications apparatus may request the first network element to deliver the first URSP, so that the terminal apparatus may update the used URSP, and the URSP used by the terminal apparatus is consistent with the URSP on the network side, thereby reducing an error rate of a network.

In a possible design, the method further includes: sending first request information to the first network element, where the first request information is used to request to obtain the information about the first application, or is used to request to obtain the first URSP.

As described in the communication method in the first aspect, the first communications apparatus may send the first request information to the first network element. In this case, the first request information may be first sent by the second communications apparatus to the first communications apparatus, and then forwarded by the first communications apparatus to the first network element. It may be understood that the second communications apparatus may fail to directly communicate with the first network element. In this case, the first communications apparatus may forward the first request information, so that the first network element can receive the first request information.

In a possible design, the method further includes: sending third request information to a UPF, where the third request information is used to indicate the UPF to determine the information about the application to which the data packet in the at least one PDU session belongs and receiving the information that is about the second application and that is sent by the UPF.

In a possible design, the method further includes: detecting the application to which the data packet transmitted in the at least one PDU session belongs, to obtain the information about the second application.

In other words, the UPF may determine the information about the second application, and then send the information about the second application to the second communications apparatus, or the second communications apparatus may determine the information about the second application. Different manners may be selected based on an actual case, and this is relatively flexible.

In a possible design, the sending second request information to a first network element includes: sending the second request information to an AMF, to forward the second request information to the first network element by using the AMF or sending the second request information to a first PCF, to forward the second request information to the first network element by using the first PCF, where the first PCF is a PCF connected to an SMF.

The second communications apparatus may fail to directly communicate with the first network element. Therefore, a network element is required for forwarding between the two. In this embodiment of this application, the AMF may be selected for forwarding, or the first PCF may be selected for forwarding. Certainly, these are only two examples, and forwarding may be performed by using another network element, provided that the second request information can be forwarded to the first network element. This manner is relatively flexible, and different paths may be selected according to a case.

In a possible design, the first network element is a second PCF or a UDR, and the second PCF is a PCF used for AM policy control.

This is merely an example herein. A specific implementation of the first network element is not limited in this embodiment of this application.

A third aspect provides a third communication method. The method may be performed by a third communications apparatus. The third communications apparatus is, for example, an AM-PCF or a chip disposed in an AM-PCF, or the third communications apparatus is, for example, a UDR or a chip disposed in an AM-PCF. The method includes: receiving first request information sent by a third network element, where the first request information is used to request to obtain a first URSP, or is used to request to obtain information about a first application of at least one PDU session, and the information about the first application is determined based on the first URSP; and sending the first URSP to the third network element when the first request information is used to request to obtain the first URSP; or sending the information about the first application to the third network element when the first request information is used to request to obtain the information about the first application.

In this embodiment of this application, in order to verify a URSP used by a terminal apparatus, a URSP on a network side or the information about the first application needs to be used. The URSP on the network side is stored in the third communications apparatus, and the information about the first application also needs to be determined based on the first URSP. Therefore, the third network element may send the first request information to the third communications apparatus, to request to obtain the first URSP or the information about the first application of the at least one PDU session. For example, the third network element may send the first URSP or the information about the first application to a second network element, so that the second network element may verify, based on the information about the first application, whether information about a second application of the at least one PDU session matches the information about the first application, in other words, verify whether the URSP used by the terminal apparatus is consistent with the URSP on the network side, so as to provide an implementation mechanism for verifying correctness of the URSP of the terminal apparatus, and ensure a normal PDU session.

In a possible design, the first request information further carries identification information of a first PDU session; and the first request information is used to request to obtain the first URSP used to determine information about a first application of the first PDU session; or the first request information is used to request to obtain information about a first application of the first PDU session, and the information about the first application includes the information about the first application of the first PDU session.

In this embodiment of this application, the first request information may request information about first applications of a plurality of PDU sessions, or URSPs corresponding to a plurality of PDU sessions, or the first request information may request information about a first application of a particular PDU session, or a URSP corresponding to a PDU session. In other words, there may be one or more PDU sessions in the at least one PDU session, to meet different requirements. If information about a first application of a PDU session or a URSP corresponding to a PDU session is requested, only identification information of the corresponding PDU session needs to be carried in the first request information. This manner is relatively simple.

In a possible design, the method further includes: receiving second request information sent by the third network element, where the second request information is used to request to deliver the first URSP; and sending the first URSP.

In this embodiment of this application, if determining that the URSP used by the terminal apparatus is inconsistent with the URSP on the network side, the third network element may request a first network element to deliver the first URSP, so that the terminal apparatus may update the used URSP, and the URSP used by the terminal apparatus is consistent with the URSP on the network side, thereby reducing an error rate of a network.

A fourth aspect provides a first communications apparatus. The communications apparatus is, for example, an SM-PCF, an AMF, or a UDM, The communications apparatus has a function of implementing the SM-PCF, the AMF, or the UDM in the foregoing method designs. These functions may be implemented by hardware, or may be implemented by hardware executing corresponding software. The hardware or software includes one or more units corresponding to the foregoing functions.

In a possible design, a specific structure of the communications apparatus may include a processor and a transceiver. The processor and the transceiver may perform corresponding functions in the method according to the first aspect or any possible design of the first aspect.

A fifth aspect provides a second communications apparatus. The communications apparatus is, for example, an SMF or a UPF. The communications apparatus has a function of implementing the SMF or the UPF in the foregoing method designs. These functions may be implemented by hardware, or may be implemented by hardware executing corresponding software. The hardware or software includes one or more units corresponding to the foregoing functions.

In a possible design, a specific structure of the communications apparatus may include a processor and a transceiver. The processor and the transceiver may perform corresponding functions in the method according to the second aspect or any possible design of the second aspect.

A sixth aspect provides a third communications apparatus. The communications apparatus is, for example, an AM-PCF or a UDR. The communications apparatus has a function of implementing the AM-PCF or the UDR in the foregoing method designs. These functions may be implemented by hardware, or may be implemented by hardware executing corresponding software. The hardware or software includes one or more units corresponding to the foregoing functions.

In a possible design, a specific structure of the communications apparatus may include a processor and a transceiver. The processor and the transceiver may perform corresponding functions in the method according to the third aspect or any possible design of the third aspect.

A seventh aspect provides a first communications apparatus. The communications apparatus is, for example, an SM-PCF, an AMF, or a UDM. The communications apparatus has a function of implementing the SM-PCF, the AMF, or the UDM in the foregoing method designs. These functions may be implemented by hardware, or may be implemented by hardware executing corresponding software. The hardware or software includes one or more units corresponding to the foregoing functions.

In a possible design, a specific structure of the communications apparatus may include a processing module and a transceiver module. The processing module and the transceiver module may perform corresponding functions in the method according to the first aspect or any possible design of the first aspect.

An eighth aspect provides a second communications apparatus. The communications apparatus is, for example, an SMF or a UPF. The communications apparatus has a function of implementing the SMF or the UPF in the foregoing method designs. These functions may be implemented by hardware, or may be implemented by hardware executing corresponding software. The hardware or software includes one or more units corresponding to the foregoing functions.

In a possible design, a specific structure of the communications apparatus may include a processing module and a transceiver module. The processing module and the transceiver module may perform corresponding functions in the method according to the second aspect or any possible design of the second aspect.

A ninth aspect provides a third communications apparatus. The communications apparatus is, for example, an AM-PCF or a UDR. The communications apparatus has a function of implementing the AM-PCF or the UDR in the foregoing method designs. These functions may be implemented by hardware, or may be implemented by hardware executing corresponding software. The hardware or software includes one or more units corresponding to the foregoing functions.

In a possible design, a specific structure of the communications apparatus may include a processing module and a transceiver module. The processing module and the transceiver module may perform corresponding functions in the method according to the third aspect or any possible design of the third aspect.

A tenth aspect provides a first communications apparatus. The communications apparatus may be the SM-PCF, the AMF, or the UDM in the foregoing method designs, or may be a chip disposed in the SM-PCF, the AMF, or the UDM. The communications apparatus includes: a memory, configured to store computer executable program code; and a processor, where the processor is coupled to the memory. The program code stored in the memory includes an instruction. When the processor executes the instruction, the communications apparatus performs the method according to the first aspect or any possible design of the first aspect.

An eleventh aspect provides a second communications apparatus. The communications apparatus may be the SMF or the UPF in the foregoing method designs, or may be a chip disposed in the SMF or the UPF. The communications apparatus includes: a memory, configured to store computer executable program code; and a processor, where the processor is coupled to the memory. The program code stored in the memory includes an instruction. When the processor executes the instruction, the communications apparatus performs the method according to the second aspect or any possible design of the second aspect.

A twelfth aspect provides a third communications apparatus. The communications apparatus may be the AM-PCF or the UDR in the foregoing method designs, or may be a chip disposed in the AM-PCF or the UDR. The communications apparatus includes: a memory, configured to store computer executable program code; and a processor, where the processor is coupled to the memory. The program code stored in the memory includes an instruction. When the processor executes the instruction, the communications apparatus performs the method according to the third aspect or any possible design of the third aspect.

A thirteenth aspect provides a communications system. The communications system includes a first communications apparatus, a second communications apparatus, and a third communications apparatus. The first communications apparatus is configured to: obtain information about a first application of at least one PDU session, where the information about the first application is determined based on a first URSP; and send the information about the first application to the second communications apparatus, where the information about the first application is used to verify whether information about a second application of the at least one PDU session matches the information about the first application, and the information about the second application is information about an application to which a data packet in the at least one PDU session belongs; the second communications apparatus is configured to: receive information about a first application of at least one PDU session, where the information about the first application is determined based on a first URSP; determine whether information about a second application of the at least one PDU session matches the information about the first application, where the information about the second application is information about an application to which a data packet in the at least one PDU session belongs; and send second request information to the third communications apparatus when determining that the information about the second application does not match the information about the first application, where the second request information is used to request the first network element to deliver the first URSP; and the third communications apparatus is configured to: receive first request information sent by the first communications apparatus, where the first request information is used to request to obtain a first URSP, or is used to request to obtain information about a first application of at least one PDU session, and the information about the first application is determined based on the first URSP; and send the first URSP to the first communications apparatus when the first request information is used to request to obtain the first URSP; or send the information about the first application to the first communications apparatus when the first request information is used to request to obtain the information about the first application.

A fourteenth aspect provides a computer storage medium. The computer-readable storage medium stores an instruction. When the instruction is run on a computer, the computer is enabled to perform the method according to the first aspect or any possible design of the first aspect.

A fifteenth aspect provides a computer storage medium. The computer-readable storage medium stores an instruction. When the instruction is run on a computer, the computer is enabled to perform the method according to the second aspect or any possible design of the second aspect.

A sixteenth aspect provides a computer storage medium. The computer-readable storage medium stores an instruction. When the instruction is run on a computer, the computer is enabled to perform the method according to the third aspect or any possible design of the third aspect.

A seventeenth aspect provides a computer program product including an instruction. The computer program product stores the instruction. When the computer program product runs on a computer, the computer is enabled to perform the method according to the first aspect or any possible design of the first aspect.

An eighteenth aspect provides a computer program product including an instruction. The computer program product stores the instruction. When the computer program product runs on a computer, the computer is enabled to perform the method according to the second aspect or any possible design of the second aspect.

A nineteenth aspect provides a computer program product including an instruction. The computer program product stores the instruction. When the computer program product runs on a computer, the computer is enabled to perform the method according to the third aspect or any possible design of the third aspect.

In the embodiments of this application, the second network element may verify whether the URSP used by the terminal apparatus is consistent with the URSP on the network side, so as to provide an implementation mechanism for verifying correctness of the URSP of the terminal apparatus, and ensure that the PDU session is normally performed.

DESCRIPTION OF EMBODIMENTS

Figure 1:
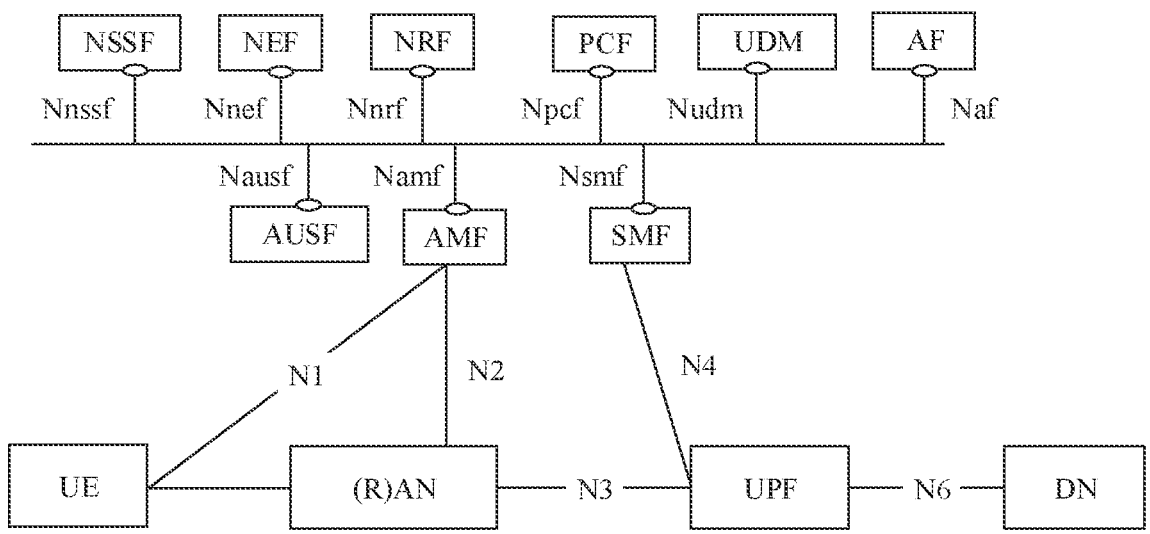
FIG. 1 to FIG. 6 are schematic diagrams of several application scenarios according to embodiments of this application.

To make the objectives, technical solutions, and advantages of the embodiments of the present invention clearer, the following further describes the embodiments of the present invention in detail with reference to the accompanying drawings.

The following describes some terms in the embodiments of this application, to facilitate understanding of a person skilled in the art.

(1) Terminal apparatus: The terminal apparatus includes a device that provides a user with voice and/or data connectivity, for example, may include a handheld device with a wireless connection function, or a processing device connected to a wireless modem. The terminal apparatus may communicate with a core network through a radio access network (RAN), and exchange voice and/or data with the RAN. The terminal apparatus may include user equipment (UE), a wireless terminal apparatus, a mobile terminal apparatus, a subscriber unit, a subscriber station, a mobile station, a mobile, a remote station, an access point (AP), a remote terminal apparatus, an access terminal apparatus, a user terminal apparatus a user agent, a user device, or the like. For example, the terminal apparatus may include a mobile phone (or referred to as a "cellular" phone), a computer having a mobile terminal apparatus, a portable, pocket-sized, handheld, computer-embedded, or vehicle-mounted mobile apparatus, or a smart wearable device. For example, the terminal apparatus is a device such as a personal communication service (PCS) phone, a cordless phone, a session initiation protocol (SIP) phone, a wireless local loop (WLL) station, or a personal digital assistant (PDA). The terminal apparatus further includes a limited device, for example, a device with relatively low power consumption, a device with a limited storage capability, or a device with a limited computing capability. For example, the terminal apparatus includes an information sensing device such as a bar code, radio frequency identification (RFID), a sensor, a global positioning system (GPS), or a laser scanner.

As an example instead of a limitation, the terminal apparatus in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, for example, various smart bands, smart helmets, or smart jewelry for monitoring physical signs.

(2) Network element: The network element is also referred to as a network device, and includes, for example, an access network element, or is referred to as an access network device, for example, a base station (for example, an access point) and a user plane function (UPF).

The base station may be a device that communicates with the wireless terminal apparatus over an air interface in an access network by using one or more cells. The network element may be configured to mutually convert a received over-the-air frame and an Internet Protocol (IP) packet and serve as a router between the terminal apparatus and a rest part of the access network, where the rest part of the access network may include an IP network. The network element may further coordinate attribute management of the air interface. For example, the network element may include an evolved NodeB (NodeB, or eNB, or e-NodeB, evolutional Node B) in a long term evolution (LTE) system or an LTE advanced system (LTE-A), or may include a next generation NodeB (gNB) in a 5th generation mobile communications technology (5G) new radio (NR) system, or may include a centralized unit (CU) and a distributed unit (DU) in a cloud access network (CloudRAN) system. This is not limited in the embodiments of this application.

The UPF is a functional network element of a user plane, and is mainly responsible for connecting to an external network. It may be considered that the UPF is equivalent to a combination of a serving gateway (SGW) and a packet data network gateway (PDN-GW) in LTE.

In the embodiments of this application, the network element further includes a core network element, or is referred to as a core network device, fir example, includes a policy control function (PCF), a unified data repository (UDR), an access and mobility management function (AMF), or a session management function (SMF). In a 5G system, functions of a mobility management entity (MME) are separated into the AMF and the SMF. The AMF is configured to manage a mobile context of a user, and the SMF is configured to manage a session context.

In addition, according to an existing 5G standard, the AMF and the SMF may select different PCFs for policy control. For ease of differentiation, a PCF used for AM policy control is referred to as an AM-PCF, or referred to as a second PCF, that is, referred to as an AM-PCF or a second PCF for short, and a PCF connected to the SMF is an SM-PCF, or referred to as a first PCF, that is, referred to as an SM-PCF or a first PCF for short. It should be noted that the AM-PCF and the SM-PCF are merely used to distinguish roles, and do not limit or distinguish functions of PCFs. Optionally, the AM-PCF and the SM-PCF may be different PCFs, or may be a same PCF.

(3) URSP; in 5G, the URSP is introduced, and a terminal apparatus performs the URSP to select, for an uplink service flow, a PDU session that meets the URSP. To be specific, some services have specific requirements on a DNN, a slice, an SSC mode, and the like of a used PDU session. It may be understood that the URSP specifies applications corresponding to an attribute of a PDU session. For example, if the PDU session has a plurality of attributes, and different PDU sessions may have different attributes, the URSP specifies applications corresponding to each attribute of the PDU session. For example, a first PDU session has a first attribute, and applications corresponding to the first attribute may be determined based on the URSP, so that the applications are applications allowed to be used for the first PDU session.

The URSP is formulated by a network side. Generally, it is required that a URSP used by the terminal apparatus needs to be consistent with a URSP on the network side. In this way, a PDU session selected by the terminal apparatus can meet a requirement of the network side.

(4) The terms "system" and "network" may be used interchangeably in the embodiments of this application. "A plurality of" means two or more. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects.

The following describes a technical background of the embodiments of this application.

In 5G, a URSP is introduced, and a terminal apparatus serves as an executor of a policy, to select a proper PDU session for an uplink service flow. To be specific, some services have specific requirements on a DNN, a slice, an SSC mode, and the like of a used PDU session.

The URSP is formulated by a network side, and a URSP used by the terminal apparatus is required to be consistent with a URSP stored by the network side, so as to ensure normal communication between the terminal apparatus and the network side. However, when the URSP is actually used, the URSP used by the terminal apparatus may be different from the URSP delivered by the network side. For example, when the terminal apparatus initially enters a network, if the terminal apparatus fails to obtain a URSP of the network, or the terminal apparatus maliciously uses a PDU session with a relatively good characteristic, or an internal algorithm of the terminal apparatus is incorrect, the URSP used by the terminal apparatus may be different from the URSP delivered by the network side. This may cause an error in the PDU session.

In view of this, the technical solutions in the embodiments of this application are provided, to verify whether the URSP of the terminal apparatus is consistent with the URSP on the network side.

The technical solutions provided in the embodiments of this application may be generally applicable to a non-roaming scenario and a roaming scenario of a 5G system. The following separately describes these scenarios. In the following scenario descriptions, an example in which the terminal apparatus is UE is used.

FIG. 1 is a first architectural diagram of a non-roaming scenario in a 5G system. In FIG. 1, service-based interfaces are used within a control plane (service-based interfaces are used within the control plane). In FIG. 1, a network slice selection function (NSSF), a network service exposure function (NEF), a network element data repository function (NRF), a PCF, unified data management (UDM), an application function (AF), an authentication server function (AUSF), an AMF, and an SMF are connected to a same connection line. The NSSF is connected to the connection line through an Nnssf interface; the NEF is connected to the connection line through an Nnef interface; the NRF is connected to the connection line through an Nnrf interface; the PCF is connected to the connection line through an Npcf interface; the UDM is connected to the connection line through an Nudm interface; the AF is connected to the connection line through an Naf interface; the AUSF is connected to the connection line through an Nausf interface; the AMF is connected to the connection line through an Namf interface; and the SMF is connected to the connection line through an Nsmf interface. In addition, the AMF further communicates with a (radio) access network ((R)AN) through an N2 interface, and communicates with UE through N1. The UE can communicate with the (R)AN, the (R)AN communicates with a UPF through an N3 interface, and the UPF is connected to the SMF through an N4 interface, and is connected to a data network (DN) through an N6 interface.

Figure 2:
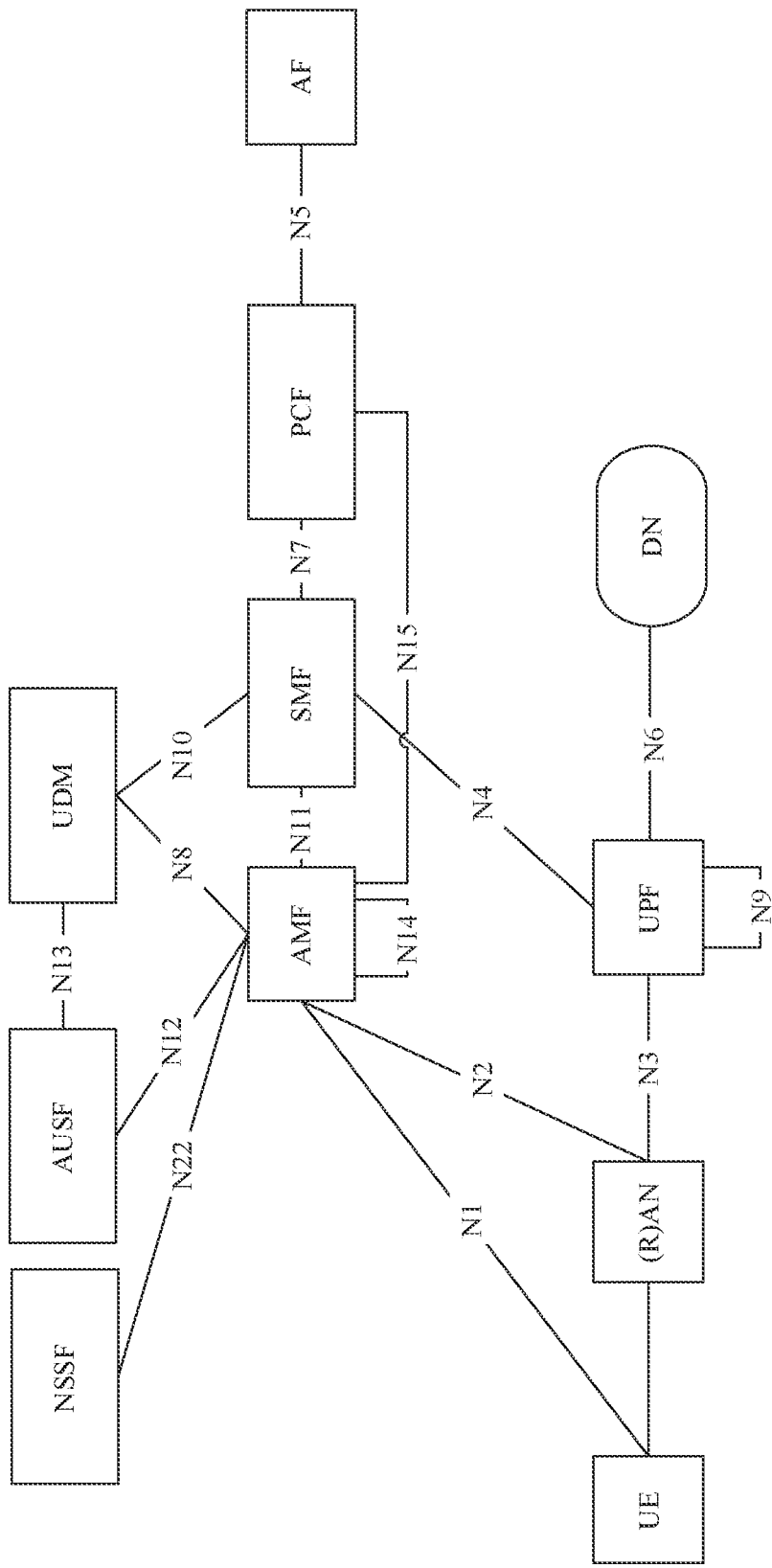

FIG. 2 is a second architectural diagram of a non-roaming scenario in a 5G system. FIG. 2 is a reference point architecture. In FIG. 2, UE may communicate with an AMF by using a (R)AN, and the (R)AN communicates with the AMF through an N2 interface. In addition, the UE may also directly communicate with the AMF through an N1 interface. In addition, the (R)AN further communicates with a UPF through an N3 interface, the UPF communicates with another UPF through an N9 interface, and the UPF further communicates with a DN through an N6 interface, and communicates with an SMF through an N4 interface. The AMF communicates with another AMF through an N14 interface. The AMF further communicates with the SMF through an N11 interface, communicates with an AUSF through an N12 interface, communicates with a UDM through an N8 interface, communicates with a PCF through an N15 interface, and communicates with an NSSF through an N22 interface. The SMF communicates with the UDM through an N10 interface, and communicates with the PCF through an N7 interface, and the PCF communicates with an AF through an N5 interface.

Figure 3:
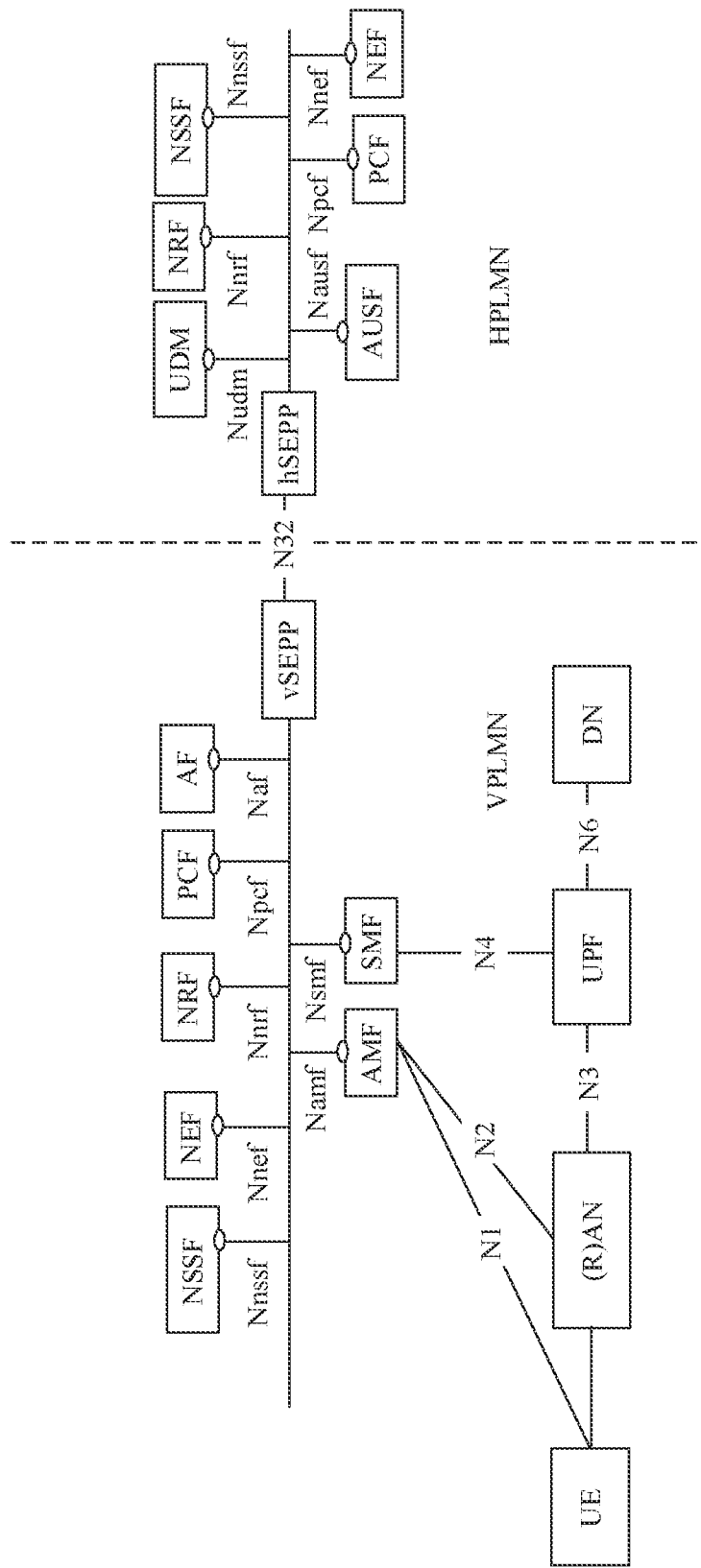

FIG. 3 is a first architectural diagram of a roaming scenario in a 5G system. FIG. 3 is a local breakout (LBO) scenario. In FIG. 3, a visited public land mobile network (VPLMN) indicates a network in which UE is located after roaming, and a home public land mobile network (HPLMN) indicates a network in which the UE is located before roaming, that is, the UE roams from the HPLMN to the VPLMN. In the VPLMN, an NSSF, an NEF, an NRF, a PCF, an AF, an AMI, and an SMF are connected to a same connection line. The NSSF is connected to the connection line through an Nnssf interface; the NEF is connected to the connection line through an Nnef interface; the NRF is connected to the connection line through an Nnrf interface; the PCF is connected to the connection line through an Npcf interface; the AF is connected to the connection line through an Naf interface; the AMF is connected to the connection line through an Namf interface; and the SMF is connected to the connection line through an Nsmf interface. The connection line is further connected to a visit security edge protection proxy (vSEPP). In addition, the AMF further communicates with a (radio) access network ((R)AN) through an N2 interface, and communicates with the UE through N1. The UE can communicate with the (R)AN, the (R)AN communicates with a UPF through an N3 interface, and the UPF is connected to the SMF through an N4 interface, and is connected to a ON through an N6 interface. In the HPLMN, a UDM, qui NRF, an NSSF, an AUSF, a PCF, and an NEF are connected to a same connection line. The UDM is connected to the connection line through an Nudm interface; the NSSF is connected to the connection line through an Nnssf interface; the NEF is connected to the connection line through an Nnef interface; the NRF is connected to the connection line through an Nnrf interface; and the PCF is connected to the connection line through an Npcf interface. The connection line is further connected to an hSEPP, and a vSEPP is connected to the home security edge protection proxy (hSEPP) through an N32 interface.

Figure 4:
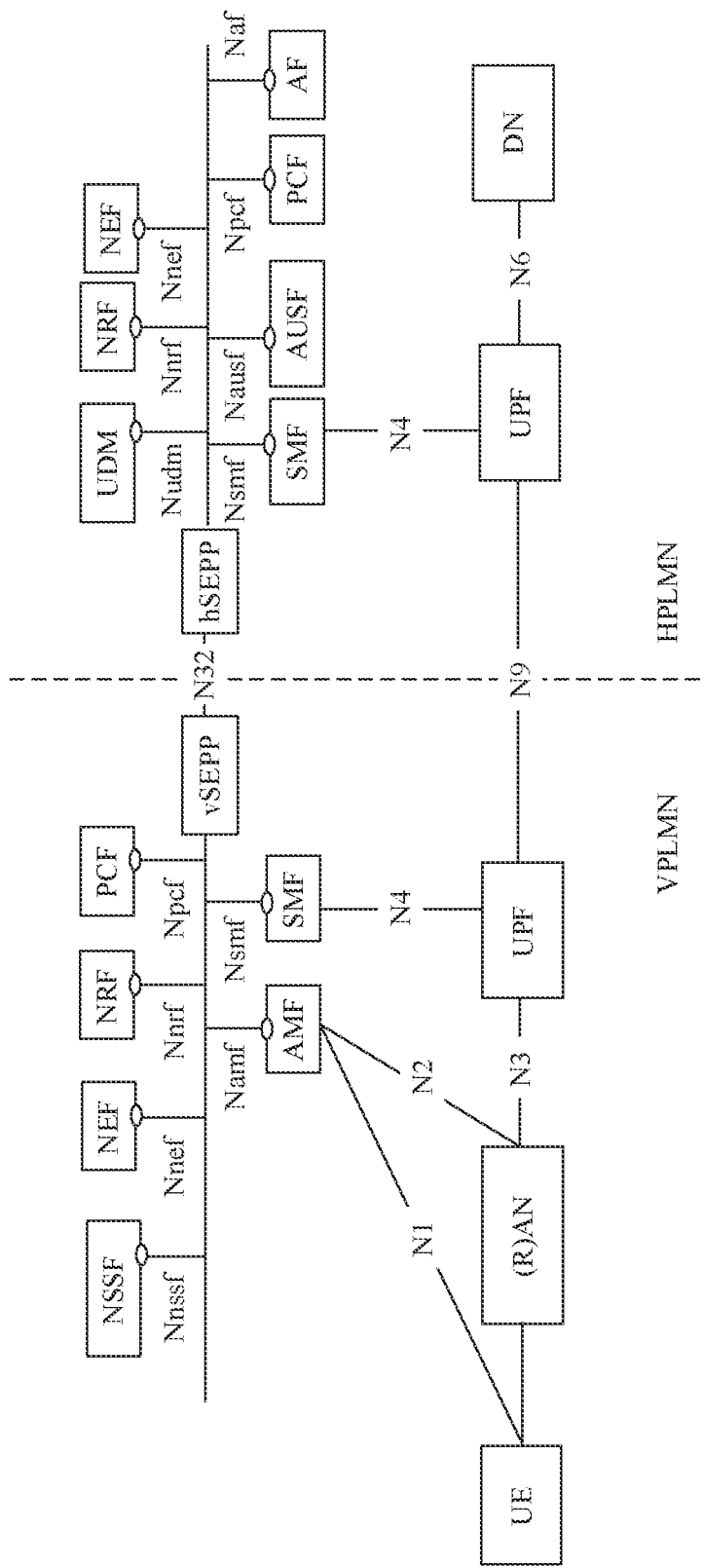

FIG. 4 is a second architectural diagram of a roaming scenario in a 5G system. FIG. 4 is an LBO scenario. In FIG. 4, a VPLMN indicates a network in which UE is located after roaming, and an HPLMN indicates a network in which the UE is located before roaming. In the VPLMN, an NSSF, an NEF, ati NRF, a PCF, an AMF, and an SMF are connected to a same connection line. The NSSF is connected to the connection line through an Nnssf interface; the NEF is connected to the connection line through an Nnef interface; the NRF is connected to the connection line through an Nnrf interface; the PCF is connected to the connection line through an Npcf interface; the AMF is connected to the connection line through an Namf interface; and the SMF is connected to the connection line through an Nsmf interface. The connection line is further connected to a vSEPP. In addition, the AMF further communicates with a (R)AN through an N2 interface, and communicates with the UE through N1. The UE can communicate with the (R)AN, the (R)AN communicates with a UPF through an N3 interface, and the UPF is connected to the SMF through an N4 interface, and is connected to a UPF in the HPLMN through an N9 interface. In the HPLMN, a UDM, an NRF, an AUSF, an SMF, an AF, a PCF, and an NEF are connected to a same connection line. The UDM is connected to the connection line through an Nudin interface; the NSSF is connected to the connection line through an Nnssf interface; the NEF is connected to the connection line through an Nnef interface the NRF is connected to the connection line through an Nnrf interface; the PCF is connected to the connection line through an Npcf interface; the AF is connected to the connection line through an Naf interface; and the SMF is connected to the connection line through an Nsmf interface. The connection line is further connected to an hSEPP, and a VSEPP is connected to the hSEPP through an N32 interface. A UPF is connected to the SMF through an N4 interface, and is connected to a DN through an N6 interface.

Figure 5:
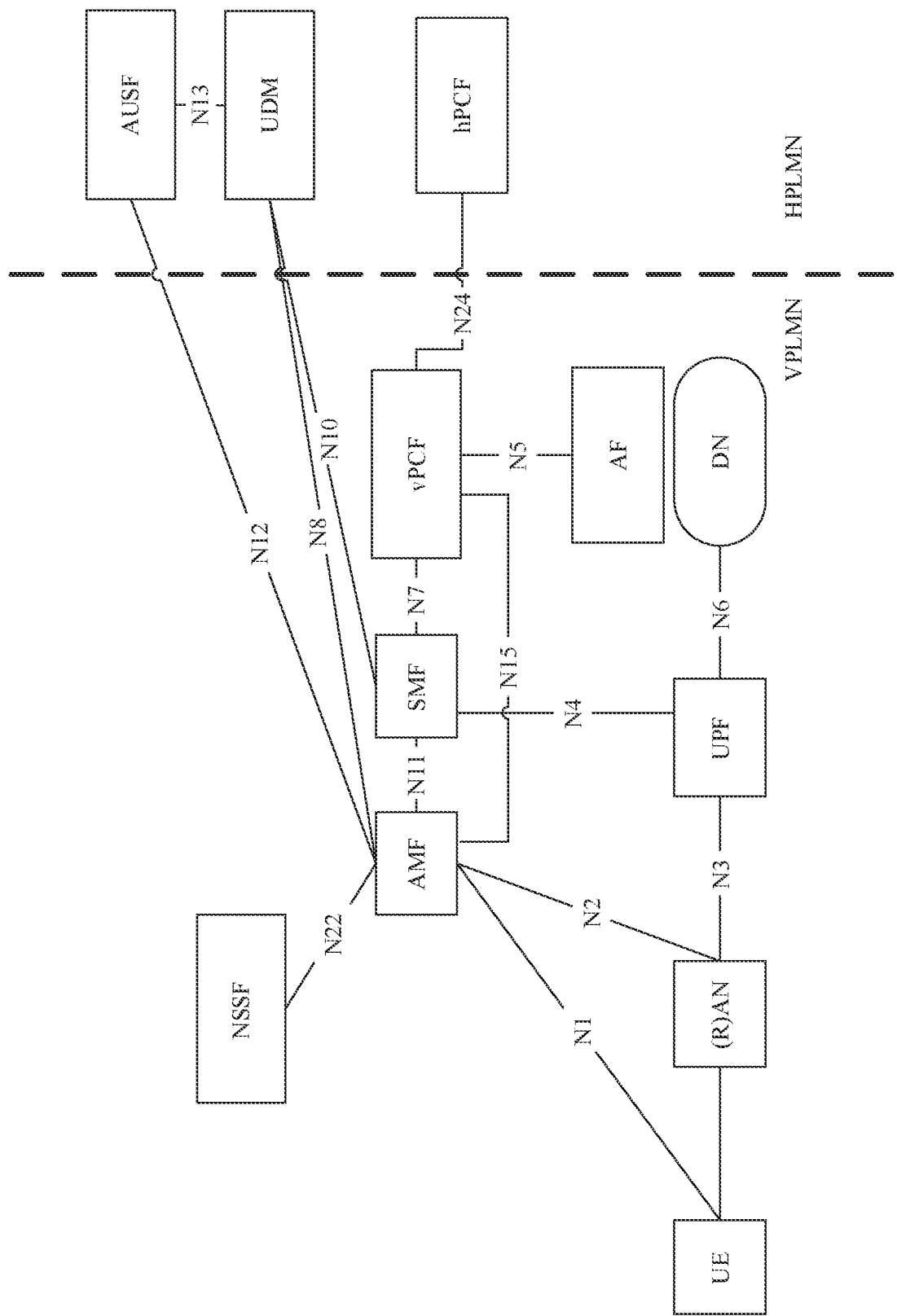

FIG. 5 is a third architectural diagram of a roaming scenario in a 5G system. FIG. 5 is also an LBO scenario. In FIG. 5, a VPLMN indicates a network in which UE is located after roaming, and an HPLMN indicates a network in which the UE is located before roaming. In FIG. 5, an NSSF in the VPLMN communicates with an AMF through an N22 interface. The AMF communicates with the UE through an N1 interface, communicates with a (R)AN through an N2 interface, communicates with an SMF through an N11 interface, communicates with a vPCF through an N15 interface, communicates with an AUSF in the HPLMN through an N12 interface, and communicates with a UDM in the HPLMN through an N8 interface. The SMF communicates with a UPF through an N4 interface, communicates with the vPCF through an N7 interface, and communicates with the UDM in the HPLMN through an N10 interface. The vPCF communicates with an AF through an N5 interface and communicates with an hPCF in the HPLMN through an N24 interface. The UE can communicate with the (R)AN, the (R)AN communicates with the UPF through an N3 interface, and the UPF communicates with a DN through an N6 interface.

Figure 6:
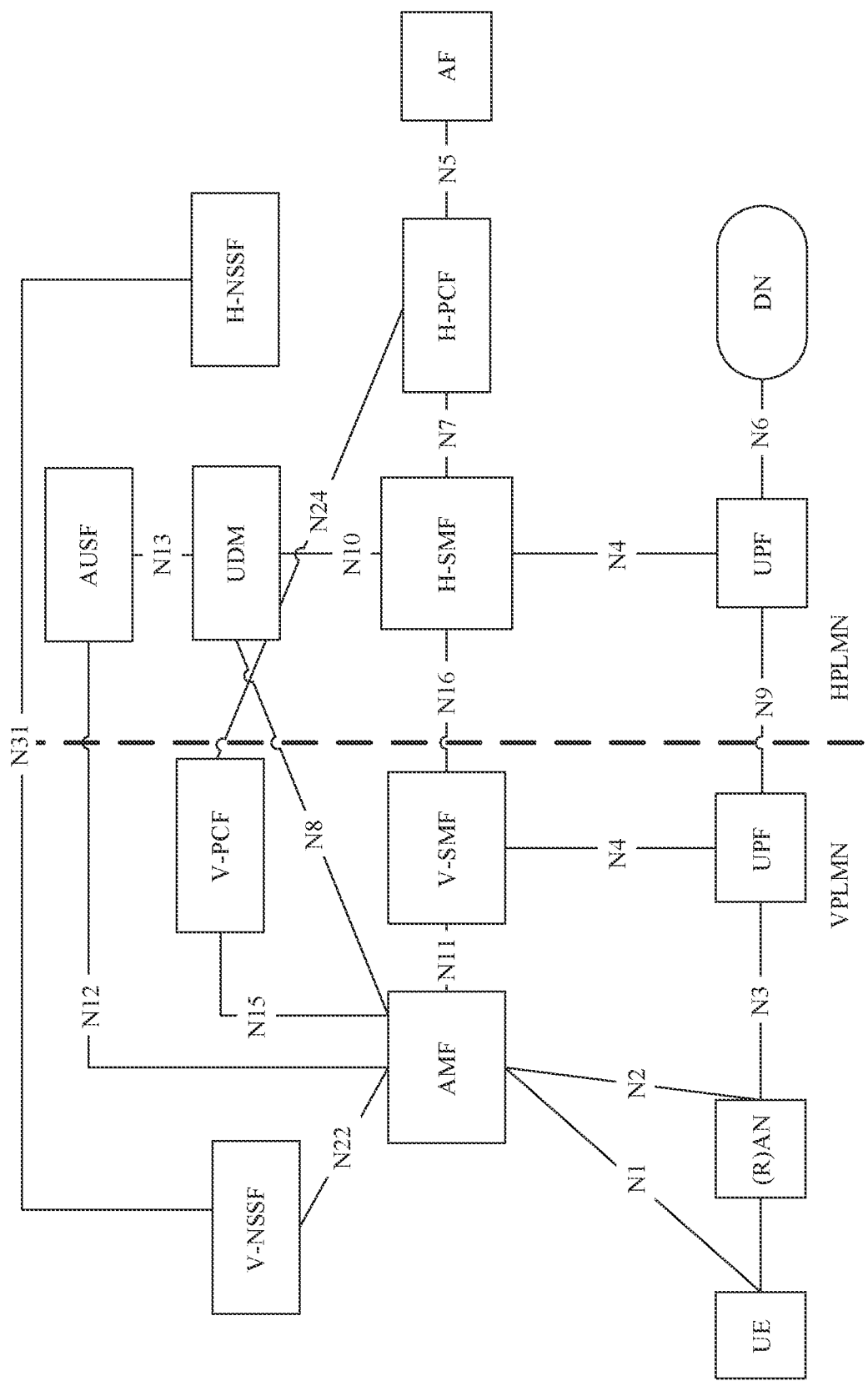

FIG. 6 is a fourth architectural diagram of a roaming scenario in a 5G system. FIG. 6 is a home routed (HR) scenario. In FIG. 6, a VPLMN indicates a network in which UE is located after roaming, and an HPLMN indicates a network in which the UE is located before roaming. In FIG. 6, a V-NSSF in the VPLMN communicates with an AMF through an N22 interface, and communicates with an H-NSSF in the HPLMN through an N31 interface. The AMF communicates with the UE through an N1 interface, communicates with a (R)AN through an N2 interface, communicates with an AUSF in the PLMN through an N12 interface, communicates with a V-PCF through an N15 interface, communicates with a V-SMF through an N11 interface, and communicates with a UDM in the HPLMN through an N8 interface. The V-SMF communicates with a UPF in the VPLMN through an N4 interface and communicates with an H-SMF in the HPLMN through an N16 interface. The H-SMF communicates with a UPF in the HPLMN through the N4 interface, communicates with an H-PCF through an N7 interface, and communicates with a UDM through an N10 interface. The UDM communicates with an AUSF through an N13 interface, and the H-PCF communicates with the V-PCF through an N24 interface and communicates with an AF through an N5 interface. The UE can communicate with the (R)AN, the (R)AN communicates with the UPF in the VPLMN through an N3 interface, the UPF in the VPLMN communicates with the UPF in the HPLMN through an N9 interface, and the UPF in the HPLMN further communicates with a DN through an N6 interface.

It should be understood that the (R)AN refers to a 3rd generation partnership project (3GPP), for example, an eNB in an LTE system or a gNB in an NR system.

Any one of the scenarios shown in FIG. 1 to FIG. 6 may be used as an application scenario of the embodiments of this application.

"V" and "v" added before a network element have same meanings, and both indicate that the network element belongs to the VPLMN. For example, a "V-PCF" or a "vPCF" indicates a PCF in the VPLMN. "H" and "h" added before a network element also have same meanings, and indicate that the network element belongs to the HPLMN. For example, an H-PCF or an hPCF indicates a PCF in the HPLMN. In other words, "V" or "H" is only a description of a network or a location in which the network element is located, and does not indicate a limitation on a function. For example, the V-PCF and the H-PCF may have a same function or different functions.

The foregoing describes several application scenarios of the embodiments of this application. Certainly, the foregoing several scenarios are merely examples. The embodiments of this application are not limited to the foregoing application scenarios.

The following describes the technical solutions provided in the embodiments of this application with reference to the accompanying drawings. In the following description process, that the technical solutions provided in the embodiments of this application are applied to the application scenario shown in FIG. 1, the application scenario shown in FIG. 2, the application scenario shown in FIG. 3, the application scenario shown in FIG. 4, the application scenario shown in FIG. 5, or the application scenario shown in FIG. 6 is used as an example.

Figure 7A:
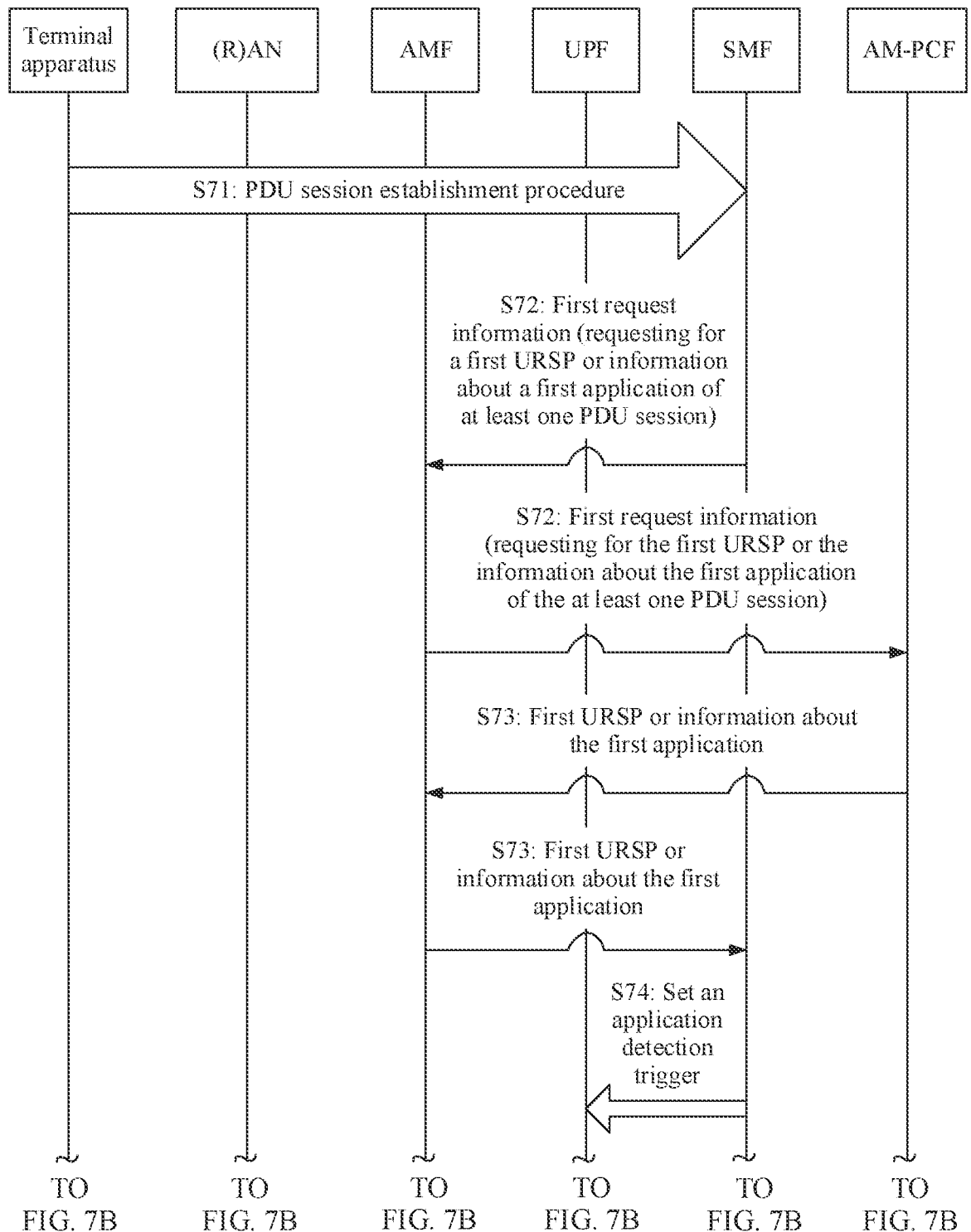
FIG. 7A to FIG. 9B are flowcharts of three communication methods according to embodiments of this application.
Figure 7B:
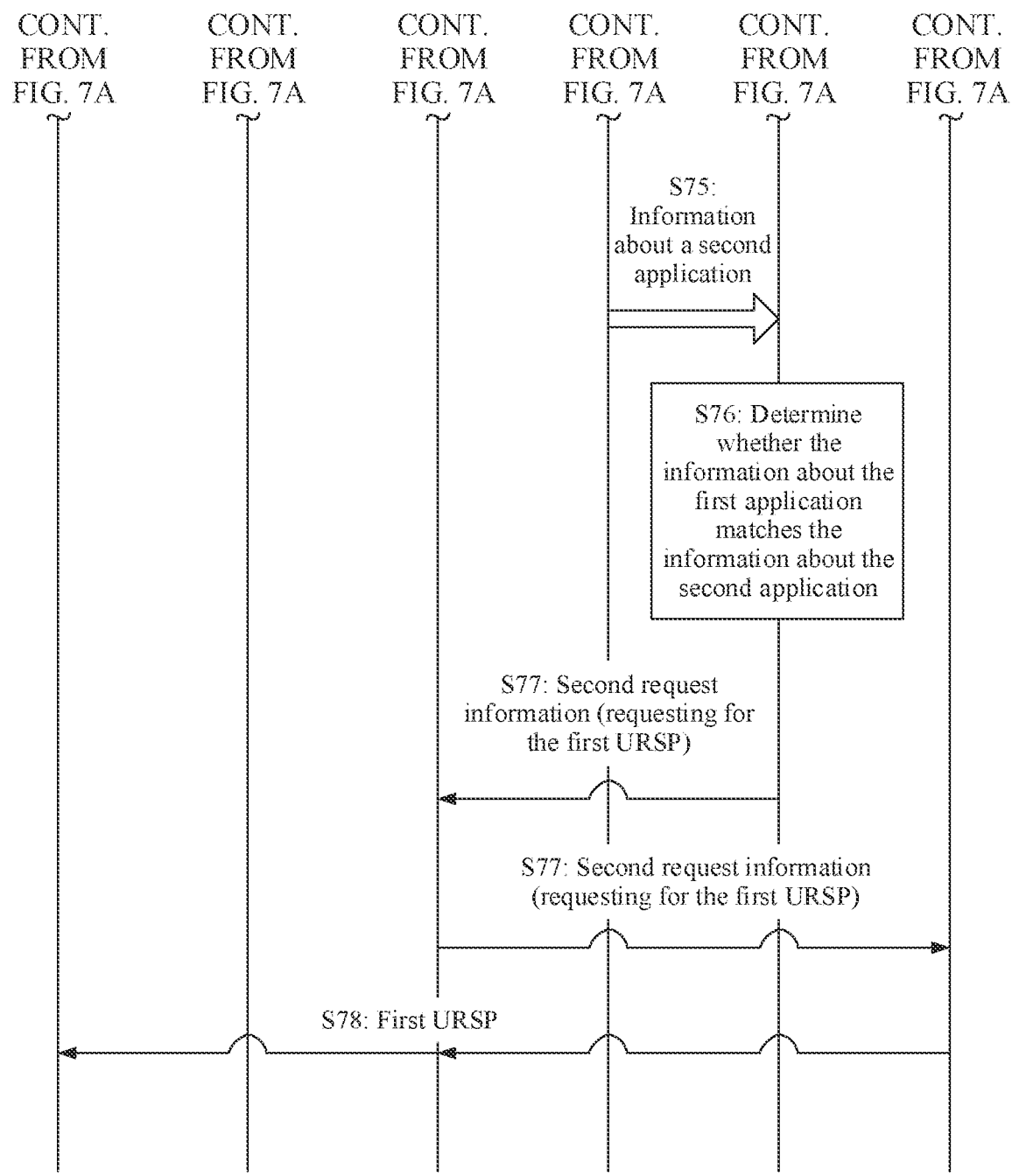

FIG. 7A and FIG. 7B show a first communication method according to an embodiment of this application. A procedure of the method is described as follows.

S71: A terminal apparatus initiates a PDU session establishment procedure.

As shown in FIG. 7A and FIG. 7B, the PDU session establishment procedure is initiated by the terminal apparatus, and information passes through a RAN and an AMF, and arrives at an SMF. In S71, it may be considered that PDU session establishment is completed. For example, a PDU session established in S71 is referred to as a first PDU session. In this case, a step starting from S72 is a step performed after the first PDU session is established. Alternatively, it may be considered that S71 is a PDU session establishment process, but establishment of a PDU session is not completed. In this case, steps S72 to S75 may be performed in the PDU session establishment process, and a step starting from S76 is a step performed after a first PDU session is established.

S72: A second network element sends first request information to a first network element, and the first network element receives the first request information from the second network element, where the first request information is used to request to obtain a first URSP, or is used to request to obtain information about a first application of at least one PDU session. The information about the first application is determined based on the first URSP. The first URSP may be understood as a URSP on a network side, that is, a URSP in an AM-PCF. The first URSP may include one specific URSP or include a plurality of URSPs. The first URSP specifies information about an application corresponding to an attribute of the at least one PDU session, that is, specifies the information about the first application of the at least one PDU session.

In this embodiment, the first URSP includes, for example, at least one of UE policy status information, or a policy section identifier (PSI) list, and policy content corresponding to the first URSP.

In this embodiment, the second network element is, for example, an SMF or a UPF. In FIG. 7A and FIG. 7B, the SMF is used as an example. In addition, if this embodiment is applied to a roaming scenario, the SMF may be an SMF in a VPLMN.

Figure 8A:
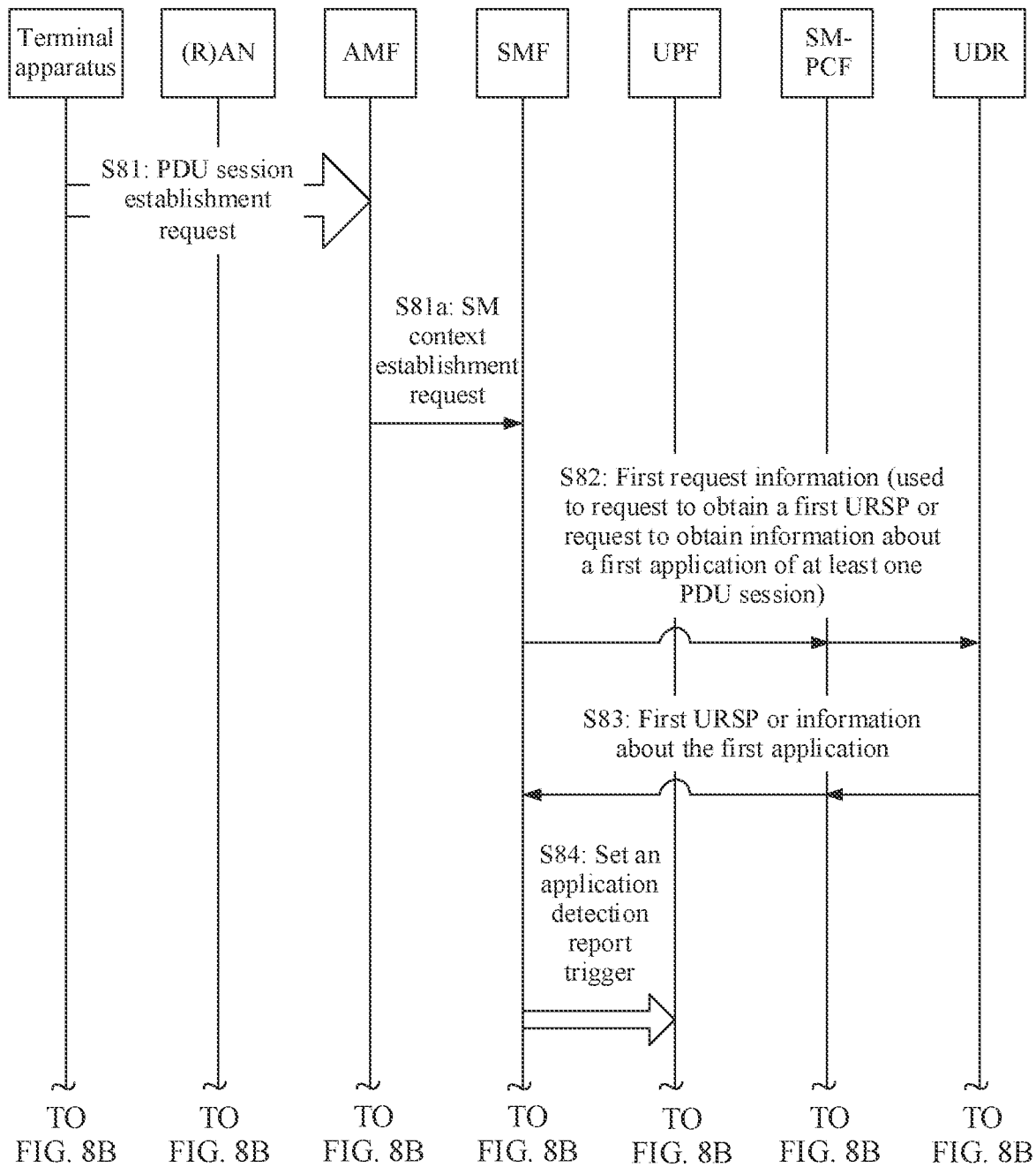

For example, if the second network element is an SMF, the SMF may forward the first request information to the first network element by using a third network element. For example, the third network element is an AMF. In other words, a specific process in which the SMF sends the first request information to the first network element is as follows: The SMF sends the first request information to the AMF, and the AMF forwards the first request information to the first network element (as shown in FIG. 8A, S72 is indicated by using steps shown by two arrows). Therefore, it may also be considered that the AMF directly sends the first request information to the first network element, and the first network element receives the first request information from the SMF, and specifically, receives, from the AMF, the first request information from the SMF. Alternatively, if the second network element is a UPF, the UPF may forward the first request information to the first network element by using an SMF and a third network element. For example, the third network element is an AMF. In other words, a specific process in which the UPF sends the first request information to the first network element is as follows: The UPF sends the first request information to the SMF, the SMF forwards the first request information to the AMF, and the AMF forwards the first request information to the first network element. Therefore, it may also be considered that the AMF directly sends the first request information to the first network element, and the first network element receives the first request information from the SMF, and specifically, receives, from the AMF, the first request information from the UPF.

The first network element is, for example, an AM-PCF. Because a URSP is generated by the AM-PCF, the information about the first application is also determined based on the first URSP, and the information may be determined by the AM-PCF, both the URSP and the information about the first application may be directly requested from the AM-PCF. If the first request information is used to request to obtain the information about the first application, after receiving the first request information, the AM-PCF needs to determine, based on the first URSP, the information about the first application. In addition, if this embodiment is applied to a roaming scenario, the AM-PCF refers to an AM-PCF in an HPLMN.

S73: if the first network element sends the first URSP to the second network element, the second network element receives the first URSP or the information about the first application; or if the first network element sends the information about the first application to the second network element, the second network element receives the information about the first application.

Information sent by the first network element to the second network element may be forwarded by the third network element to the second network element. For example, when the first request information is used to request to obtain the first URSP, the first network element sends the first URSP to the third network element, and the third network element forwards the first URSP to the second network element. In this case, the second network element receives the first URSP forwarded by the third network element, and it is considered that the second network element obtains the first URSP. Alternatively, when the first request information is used to request to obtain the information about the first application of the at least one PDU session, the first network element sends the first URSP or the information about the first application to the third network element. If the third network element receives the first URSP, the third network element may obtain, based on the first URSP, the information about the first application, and then forward the information about the first application to the second network element. If the third network element receives the information about the first application, the third network may directly forward the information about the first application to the second network element. In this case, the second network element receives the information about the first application forwarded by the third network element, and it is considered that the second network element obtains the information about the first application. Alternatively, when the first request information is used to request to obtain the first URSP or the information about the first application of the at least one PDU session, the first network element sends the first URSP to the third network element, and the third network element obtains, based on the first URSP, the information about the first application, and sends the information about the first application to the second network element. If the second network element receives the information about the first application sent by the third network element, it is considered that the second network element obtains the information about the first application.

For example, the first network element is an AM-PCF, the second network element is an SMF, and the third network element is an AMF.

It may be understood that the first URSP includes all URSPs stored in the AM-PCF. In this case, if the first request information is used to request the first URSP, the AM-PCF determines all the stored URSPs, and sends the first URSP to the AMF. The first URSP sent to the AMF may include all the URSPs stored in the AM-PCF, and the AMF may directly send the first URSP to the SMF, or obtain, based on the first URSP, the information about the first application of the at least one PDU session, and send the information about the first application to the SMF. Alternatively, if the first request information is used to request the information about the first application of the at least one PDU session, the first request information may request information about a first application of a PDU session that has an attribute specified in all the URSPs stored in the AM-PCF, so that the AM-PCF determines, based on all the URSPs stored in the AM-PCF, the information about the first application of the PDU session that has the attribute specified in the URSPs, sends the information to the AMF, and forwards the information to the SMF by using the AMF, and the information that is about the first application and that is sent by the AM-PCF to the AMF may include the information about the first application of the PDU session that has the attribute specified in all the URSPs stored in the AM-PCF. Alternatively, if the first request information is used to request the information about the first application of the at least one PDU session, the first request information may request information about a first application of a PDU session that has an attribute specified in all the URSPs stored in the AM-PCF, so that the AM-PCF determines all the stored URSPs, and sends the first URSP to the AMF. The first URSP sent to the AMF may include all the URSPs stored in the AM-PCF, and the AMF may obtain, based on the first URSP, the information about the first application of the at least one PDU session, and send the information about the first application to the SMF. If it is understood that the first URSP includes all the URSPs stored in the AM-PCF, in other words, the first request information requests all the URSPs or requests the information about the first application of the PDU session that has the attribute specified in all the URSPs stored in the AM-PCF, the first request information does not need to carry information such as attribute information of the URSP or an identity number of the PDU session (PDU session ID).

Alternatively, it may be understood that the first URSP includes some URSPs stored in the AM-PCF, or it may be understood that the first URSP includes a URSP that is stored in the AM-PCF and that is related to a specific PDU session. In this case, if the first request information is used to request the first URSP, the first request information may request a specific URSP, and the first request information may carry attribute information of the URSP, so that the AM-PCF may send the first URSP to the AMF. In this case, the first URSP includes the URSP that conforms to the attribute information carried in the first request information, and the AMF may directly send the first URSP to the SMF, or may obtain, based on the first URSP, the information about the first application of the at least one PDU session and send the information about the first application to the SMF. Alternatively, if the first request information is used to request the information about the first application of the at least one PDU session, the at least one PDU session is a specific PDU session, and the specific PDU session is, for example, the first PDU session, the first request information may carry an identity number (ID) of the first PDU session. Optionally, the first request information may further carry attribute information of the first PDU session. In this case, the AM-PCF determines a URSP, for example, the first URSP, based on the attribute information carried in the first request information, and determines, based on the first URSP, information about a first application of the first PDU session. Therefore, the AM-PCF sends the information about the first application of the first PDU session to the AMF, and then the AMF sends the information about the first application of the first PDU session to the SMF. Alternatively, if the first request information is used to request information about a first application of the first PDU session, the first request information may carry an ID of the first PDU session, Optionally, the first request information may further carry attribute information of the first PDU session. In this case, the AM-PCF determines a URSP, for example, the first URSP, based on the attribute information carried in the first request information. The AM-PCF may send the first URSP to the AMF, and the AMF may obtain, based on the first URSP, the information about the first application of the first PDU session, and send the information about the first application to the SMF.

The information, for example, the first URSP or the information about the first application, sent by the AM-PCF to the SMF is forwarded by using the AMF. Therefore, as shown in FIG. 7A. S73 is indicated by using steps shown by two arrows.

The information about the first application may include information such as an application ID or an application filter.

In addition, information sent by the first network element needs to be forwarded to the SMF by using the AMF. There may be a plurality of SMFs communicating with one AMF, so that the AMF may forward, to an SMF that sends the first request to the AMF, the information sent by the first network element. For example, the first request carries a PDU session ID, so that the AMF determines, based on the PDU session ID, an SMF to which the information sent by the first network element is to be sent.

S74: The SMF disposes an application detection trigger, also referred to as an application detection report trigger, on the UPF.

In other words, the SMF indicates the UPF to detect an application, for example, indicates the UPF to determine an application related to the at least one PDU session. For example, the UPF may determine, through detection, the application related to the at least one PDU session. The application related to the at least one PDU session is an application actually related when the terminal apparatus performs the at least one PDU session, or is understood as an application to which a data packet in the at least one PDU session belongs. In this specification, information about the application to which the data packet in the PDU session belongs is referred to as information about a second application of a PDU session. In this case, the SMF indicates the UPF to determine the information about the second application of the at least one PDU session.

In addition, that the SMF disposes an application detection trigger on the UPF may also be understood as that the SMF sends third request information to the UPF. The third request information is used to indicate the UPF to determine the information about the application to which the data packet in the at least one PDU session belongs, in other words, indicate the UPF to determine information about the application actually related to the at least one PDU session. In this case, the UPF may determine, through detection, the information about the application to which the data packet in the at least one PDU session belongs. For example, the SMF sends the information about the first application of the at least one PDU session to the UPF, and the UPF determines, through detection, the information about the application related when the terminal apparatus performs the at least one PDU session. If the UPF detects that applications related when the terminal apparatus performs the at least one PDU session include applications that are not sent by the SMF to the UPF, these applications are applications that cannot be identified by the UPF. If the SMF obtains the first URSP, the SMF may determine, based on the first URSP, the information about the first application of the at least one PDU session. For example, the UPF detects that when the terminal apparatus performs the at least one PDU session, an application A and an application B are related. Information about the application A is included in the information about the first application of the at least one PDU session, and information about the application B is not included in the information about the first application of the at least one PDU session. In this case, the application A is an application that can be identified by the UPF, and the application B is an application that cannot be identified by the UPF.

S75: The UPF sends the information about the second application of the at least one PDU session to the SMF, and the SMF receives the information about the second application of the at least one PDU session.

Regardless of an application that can be identified by the UPF or an application that cannot be identified by the UPF, the UPF may send information about the application to the SMF provided that the application is related when the terminal apparatus performs the at least one PDU session.

If S72 to S75 are all performed in the PDU session establishment process, S74 may be implemented by using an N4 session establishment/modification request sent by the SMF to the UPF in the PDU session establishment process, and S75 may be implemented by using an N4 session establishment/modification response sent by the UPF to the SMF in the PDU session establishment process. Certainly, this is merely an example herein, and a specific implementation is not limited thereto.

S76: The SMF determines whether the information about the second application of the at least one PDU session matches the information about the first application of the at least one PDU session.

The SMF obtains the information about the first application and the information about the second application, and may compare the two and determine whether the information about the first application matches the information about the second application. The information about the first application may include information about a plurality of applications, the information about the second application may also include information about a plurality of applications, and the information about the first application matches the information about the second application. For example, a quantity of pieces of information about applications included in the information about the first application is greater than or equal to a quantity of pieces of information about applications included in the information about the second application, and the information about the applications included in the information about the second application is a subset of the information about the applications included in the information about the first application. For example, if the information about the second application includes the information about the application A, but the information about the application A is not included in the information about the first application, it indicates that the information about the first application does not match the information about the second application.

Alternatively, considering that the information about the first application includes information about different applications, types of the information about the different applications may be the same, for example, are IDs of the applications, or types of the information about the different applications may be different, for example, information about some applications is IDs of the applications, and information about the other applications is filters of the applications. The same is true for information about different applications included in the information about the second application. Therefore, if information about the applications is directly compared, a case in which a comparison result is inaccurate because types of the information about the applications are different may occur. For example, applications corresponding to the information about the first application include the application A, and applications corresponding to the information about the second application also include the application A. However, a type of information about the application A included in the information about the first application is an ID of the application A, and a type of information about the application A included in the information about the second application is a filter of the application A. Therefore, a comparison result may indicate that the two types are inconsistent, so that it may be incorrectly determined that the information about the first application does not match the information about the second application.

In view of this, the determining whether the information about the first application matches the information about the second application may also be implemented by determining whether an application corresponding to the information about the first application matches an application corresponding to the information about the second application. The information about the first application may include information about a plurality of applications, that is, the information about the first application may correspond to a plurality of applications. The information about the second application may also include information about a plurality of applications, that is, the information about the second application may also correspond to a plurality of applications. The applications corresponding to the information about the first application match the applications corresponding to the information about the second application. For example, a quantity of the applications corresponding to the information about the applications included in the information about the first application is greater than or equal to a quantity of the applications corresponding to the information about the applications included in the information about the second application, and the applications corresponding to the information about the applications included in the information about the second application are a subset of the applications corresponding to the information about the applications included in the information about the first application. For example, the information about the second application includes information about the application A, that is, the applications corresponding to the information about the second application include the application A. However, the information about the application A is not included in the information about the first application, that is, the applications corresponding to the information about the first application do not include the application A. This indicates that the applications corresponding to the information about the first application do not match the applications corresponding to the information about the second application, that is, indicates that the information about the first application does not match the information about the second application.

It may be learned that, if types of information about the applications included in the information about the first application are all consistent with types of the applications included in the information about the second application, for example, the information about the applications included in the information about the first application and the information about the applications included in the information about the second application are of a same type, comparison may be performed in any one of the foregoing manners. To be specific, the information about the applications may be compared, or the applications corresponding to the information about the applications may be compared. However, if a type of information about an application included in the information about the first application is inconsistent with a type of an application included in the information about the second application, for example, a quantity of types corresponding to the information about the applications included in the information about the first application and the information about the applications included in the information about the second application is greater than or equal to 2, preferably, the foregoing second comparison manner may be used. To be specific, whether the information about the applications is consistent is determined by determining, through comparison, whether the applications corresponding to the information about the applications are consistent.

The process of verifying the URSP shown in S74 to S76 is merely an example. In actual application, the SMF may also verify, in another manner, whether the URSP used by the terminal apparatus matches the URSP on the network side.

S77: When determining that the information about the second application of the at least one PDU session does not match the information about the first application of the at least one PDU session, the SMF sends second request information to the first network element, and the first network element receives the second request information, where the second request information is used to request the first network element to deliver the first URSP.

For example, the first network element is an AM-PCF. In this embodiment, the SMF sends the second request information to the third network element, for example, an AMF, and the AMF forwards the second request information to the AM-PCF. In this case, the AM-PCF receives, from the AMF, the second request information from the SMF.

In this embodiment, an example in which the SMF verifies whether the URSP of the terminal apparatus is incorrect is used. Alternatively, the UPF may perform the verification process. For example, the SMF sends the information about the first application of the at least one PDU session to the UPF, and the UPF determines, through detection, the information about the application related when the terminal apparatus performs the at least one PDU session, that is, determines the information about the second application of the at least one PDU session. In this case, the UPF may directly compare the information about the first application of the at least one PDU session with the information about the second application of the at least one PDU session. This comparison manner is consistent with the comparison manner of the SMF. If the UPF determines that the information about the second application of the at least one PDU session is inconsistent with the information about the first application of the at least one PDU session, the UPF may send the second request information to the AM-PCF, and the AM-PCF receives the second request information. The UPF sends the second request information to the SMF, the SMF forwards the second request information to the AMF, and then the AMF forwards the second request information to the AM-PCF. Therefore, the AM-PCF receives, from the AMF, the second request information from the UPF, where the second request information is used to request the AM-PCF to deliver the first URSP. This embodiment imposes no limitation on a network element used to verify whether the information about the first application is consistent with the information about the second application.

S78: The AM-PCF re-delivers the first URSP, and the terminal apparatus receives the first URSP. For example, the AM-PCF sends the first URSP to the AMF, and the AMF forwards the first URSP to the terminal apparatus, as shown by two arrows of S78 in FIG. 7B.

After receiving the first URSP, if the terminal apparatus needs to modify, based on the first URSP, a parameter of the PDU session that is initiated to be established in S71, the terminal apparatus may initiate a PDU session modification procedure; or if the terminal apparatus needs to reestablish a PDU session based on the first URSP, the terminal apparatus may initiate a PDU session establishment procedure. In addition, if the PDU session that is initiated to be established in S71 needs to be released, a PDU session release procedure may be initialed. For the PDU session establishment procedure, the PDU session modification procedure, the PDU session release procedure, and the like, refer to an existing standard procedure. Details are not described.

It can be learned that in this embodiment of this application, the AMF may obtain the first URSP from the AM-PCF, or obtain the information about the first application of the at least one PDU session, so that the SMF or the UPF can verify whether the URSP used by the terminal apparatus is correct. If the URSP used by the terminal apparatus is incorrect, the AM-PCF may be requested to re-deliver a correct URSP to the terminal apparatus, so that the URSP used by the terminal apparatus is consistent with the URSP on the network side, thereby ensuring a normal PDU session.

Figure 8B:
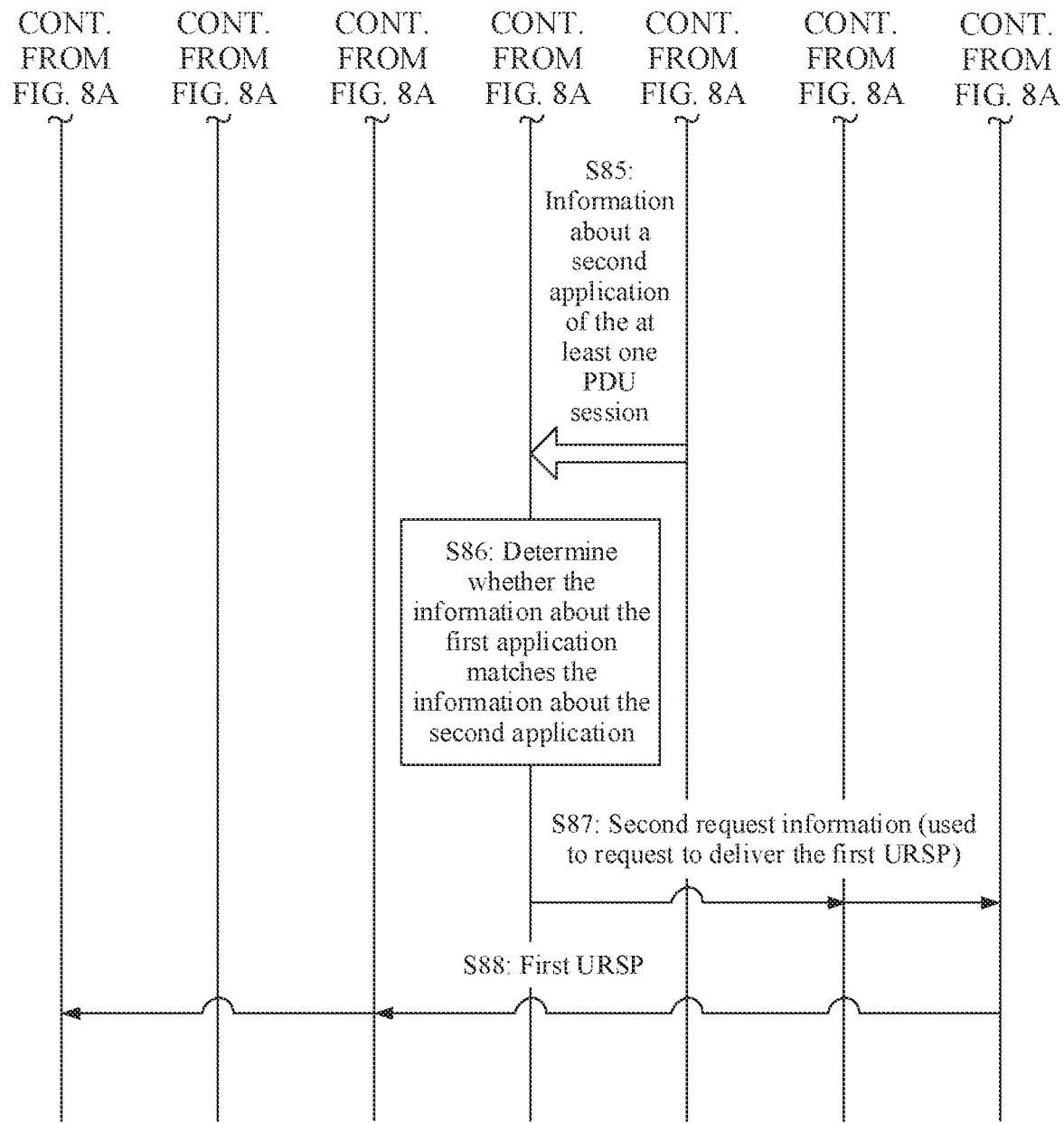

To resolve a same problem, referring to FIG. 8A and FIG. 8B, an embodiment of this application provides a second communication method. A procedure of the method is described as follows.

S81: A terminal apparatus sends a PDU session establishment request. It indicates that the terminal apparatus initiates a PDU session establishment procedure.

The terminal apparatus sends the PDU session establishment request to an AMF bar using a (R)AN, the AMF receives the PDU session establishment request, then the AMF sends an SM context establishment request to an SMF, and the SMF receives the SM context establishment request, as shown in S81a in FIG. 8A. The SM context establishment request may carry an ID of an AM-PCF, so that the SMF determines the AM-PCF. Certainly, in a non-roaming scenario or an FIR scenario of a roaming scenario, if a first network element is implemented by using a UDR, the SM context establishment request may not need to carry the ID of the AM-PCF.

S82: A second network element sends first request information to the first network element, and the first network element receives the first request information from the second network element, where the first request information is used to request to obtain a first URSP, or is used to request to obtain information about a first application of at least one PDU session. The information about the first application is determined based on the first URSP. The first URSP may be understood as a URSP on a network side, that is, a URSP in the AM-PCF. The first URSP may include one specific URSP or include a plurality of URSPs. The first URSP specifies information about an application corresponding to an attribute of the at least one PDU session, that is, specifies the information about the first application of the at least one PDU session. For content included in the first URSP, refer to related descriptions in the embodiment shown in FIG. 7A and FIG. 7B.

The second network element is, for example, zap SMF or a UPF. In FIG. 8A and FIG. 8B, the SMF is used as an example. In addition, if this embodiment is applied to a roaming scenario, the SMF may be an SMF in a VPLMN.

For example, if the second network element is an SMF, the SMF may forward the first request information to the first network element by using a third network element. For example, the third network element is an SM-PCF or an NEF. In other words, a specific process in which the SMF sends the first request information to the first network element is as follows: The SMF sends the first request information to the SM-PCF or the NEF, and the SM-PCF or the NEF forwards the first request information to the first network element, as shown by two arrows of S82 in FIG. 8A. Therefore, it may also be considered that the SM-PCF or the NEF, directly sends the first request information to the first network element, and the first network element receives the first request information from the SM-PCF or the NEF, specifically, receives, from the SM-PCF or the NEF, the first request information from the SMF. Alternatively, if the second network element is a UPF, the UPF may forward the first request information to the first network element by using an SMF and a third network element. For example, the third network element is an SM-PCF or an NEF. In other words, a specific process in which the UPF sends the first request information to the first network element is as follows: The UPF sends the first request information to the SMF, the SMF forwards the first request information to the SM-PCF or the NEF, and the SM-PCF or the NEF forwards the first request information to the first network element. Therefore, it may also be considered that the SM-PCF or the NEF directly sends the first request information to the first network element, and the first network element receives the first request information from the SMF, specifically, receives, from the SM-PCF or the NEF, the first request information from the UPF.

The first network element is, for example, an AM-PCF or a UDR. In addition, if this embodiment is applied to a roaming scenario, the AM-PCF used as the first network element refers to an AM-PCF in an HPLMN. In FIG. 8A and FIG. 8B, the UDR is used as an example of the first network element.

If the third network element is an SM-PCF, and the first network element is an AM-PCF, a communications interface needs to be newly added between the SM-PCF and the AM-PCF, so that the SM-PCF and the AM-PCF can directly communicate with each other.

S83: If the first network element sends the first URSP to the second network element, the second network element receives the first URSP or the information about the first application; or if the first network element sends the information about the first application to the second network element, the second network element receives the information about the first application.

Information sent by the first network element to the second network element may be forwarded by the third network element to the second network element. For example, when the first request information is used to request to obtain the first URSP, the first network element sends the first URSP to the third network element, and the third network element forwards the first URSP to the second network element. In this case, the second network element receives the first URSP forwarded by the third network element, and it is considered that the second network element obtains the first URSP. Alternatively, when the first request information is used to request to obtain the information about the first application of the at least one PDU session, the first network element sends the first URSP or the information about the first application to the third network element. If the third network element receives the first URSP, the third network element may obtain, based on the first URSP, the information about the first application, and then forward the information about the first application to the second network element. If the third network element receives the information about the first application, the third network may directly forward the information about the first application to the second network element. In this case, the second network element receives the information about the first application forwarded by the third network element, and it is considered that the second network element obtains the information about the first application. Alternatively, when the first request information is used to request to obtain the first URSP or the information about the first application of the at least one PDU session, the first network element sends the first URSP to the third network element, and the third network element obtains, based on the first URSP, the information about the first application, and sends the information about the first application to the second network element. If the second network element receives the information about the first application sent by the third network element, it is considered that the second network element obtains the information about the first application.

It may be understood that the first URSP includes all URSPs stored in the AM-PCF, or it may be understood that the first URSP includes a URSP that is stored in the AM-PCF and that is related to a specific PDU session. For related content of this part, refer to the descriptions of S73 in the embodiment shown in FIG. 7A.

Information sent by the first network element needs to be forwarded to the SMF by using the SM-PCF or the NEF. For example, if the first network element is a UDR, and the second network element is an SMF, the UDR sends the first URSP or the information about the first application to the SMF. Specifically, the UDR sends the first URSP or the information about the first application to the SM-PCF or the NEF, and the SM-PCF forwards the first URSP or the information about the first application to the SMF, as shown by two arrows of S83 in FIG. 8A.

There may be a plurality of SMFs communicating with one AMF, so that the AMF may forward, to an SMF that sends the first request to the AMF, the information sent by the first network element. For example, the first request carries a PDU session ID, so that the AMF determines, based on the PDU session ID, an SMF to which the information sent by the first network element is to be sent.

When the SM-PCF sends the information about the first application to the SMF, the information may be sent by using dedicated information, or may be sent by carrying the information in currently existing information. For example, in an authorization process in the prior art, the SM-PCF may determine a quality of service (QoS) attribute that can be used by a PDU session, and generate a policy rule, and the SM-PCF sends the policy rule to the SMF. Therefore, in this embodiment of this application, the information about the first application may be selected to be carried in PDU session related policy information and sent to the SMT. Certainly, the SM-PCF may alternatively send the information about the first application to the SMF by using other existing information. This is not specifically limited.

S84: The SMF disposes an application detection trigger, also referred to as an application detection report trigger, on the UPF.

S85: The UPF sends the information about the second application of the at least one PDU session to the SMF, and the SMF receives the information about the second application of the at least one PDU session.

S86: The SMF determines whether the information about the second application of the at least one PDU session matches the information about the first application of the at least one PDU session.

For S84 to S86, refer to the descriptions of S74 to S76 in the embodiment shown in FIG. 7A and FIG. 7B.

S87: When determining that the information about the second application of the at least one PDU session does not match the information about the first application of the at least one PDU session, the SMF sends second request information to the first network element, and the first network element receives the second request information, where the second request information is used to request the first network element to deliver the first URSP.

For example, the first network element is a UDR. In this embodiment, the SMF sends the second request information to the third network element, for example, an SM-PCF or an NEF, and the SM-PCF or the NEF forwards the second request information to the UDR. In this case, the UDR receives, from the SM-PCF or the NEF, the second request information from the SMF, as shown by two arrows of S87 in FIG. 8B.

In this embodiment, an example in which the SMF verifies whether a URSP of the terminal apparatus is incorrect is used. Similar to the descriptions of S77 in the embodiment shown in FIG. 7B, in this embodiment, the UPF may also perform the verification process. Details are not described again.

S88: The AM-PCF re-delivers the first URSP, and the terminal apparatus receives the first URSP. For example, the AM-PCF sends the first URSP to the AMF, and the AMF forwards the first URSP to the terminal apparatus, as shown by two arrows of S88 in FIG. 8B.

After receiving the new URSP, if the PDU session initiated in S81 has been established, and the terminal apparatus needs to modify, based on the first URSP, a parameter of the PDU session, the terminal apparatus may initiate a PDU session modification procedure; or if the terminal apparatus needs to re-establish a PDU session based on the first URSP, the terminal apparatus may initiate a PDU session establishment procedure. In addition, if the PDU session initiated in S81 has been established, and the terminal apparatus needs to release the PDU session, the terminal apparatus may initiate a PDU session release procedure. For the PDU session establishment procedure, the PDU session modification procedure, the PDU session release procedure, and the like, refer to an existing standard procedure. Details are not described.

It can be learned that in this embodiment of this application, the SM-PCF or the NEF may obtain the first URSP from the AM-PCF or the UDR, or obtain the information about the first application of the at least one PDU session, so that the SMF or the UPF can verify whether the URSP used by the terminal apparatus is correct. If the URSP used by the terminal apparatus is incorrect, the AM-PCF or the UDR may be requested to re-deliver a correct URSP to the terminal apparatus, so that the URSP used by the terminal apparatus is consistent with the URSP on the network side, thereby ensuring that the PDU session is normally performed.

In this embodiment, the first URSP includes, for example, at least one of UE, policy status information or a PSI list, and policy content corresponding to the first URSP.

Figure 9A:
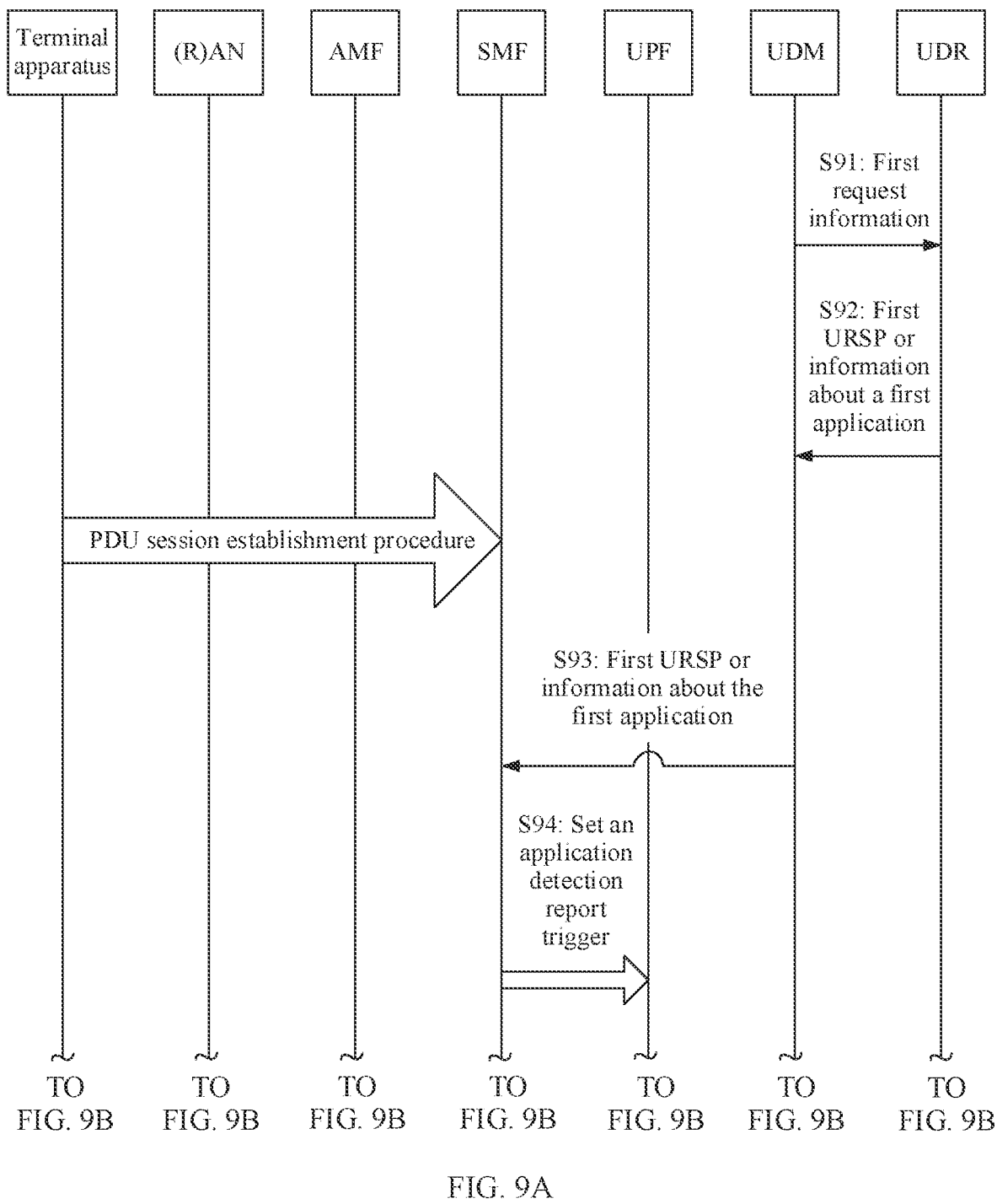
Figure 9B:
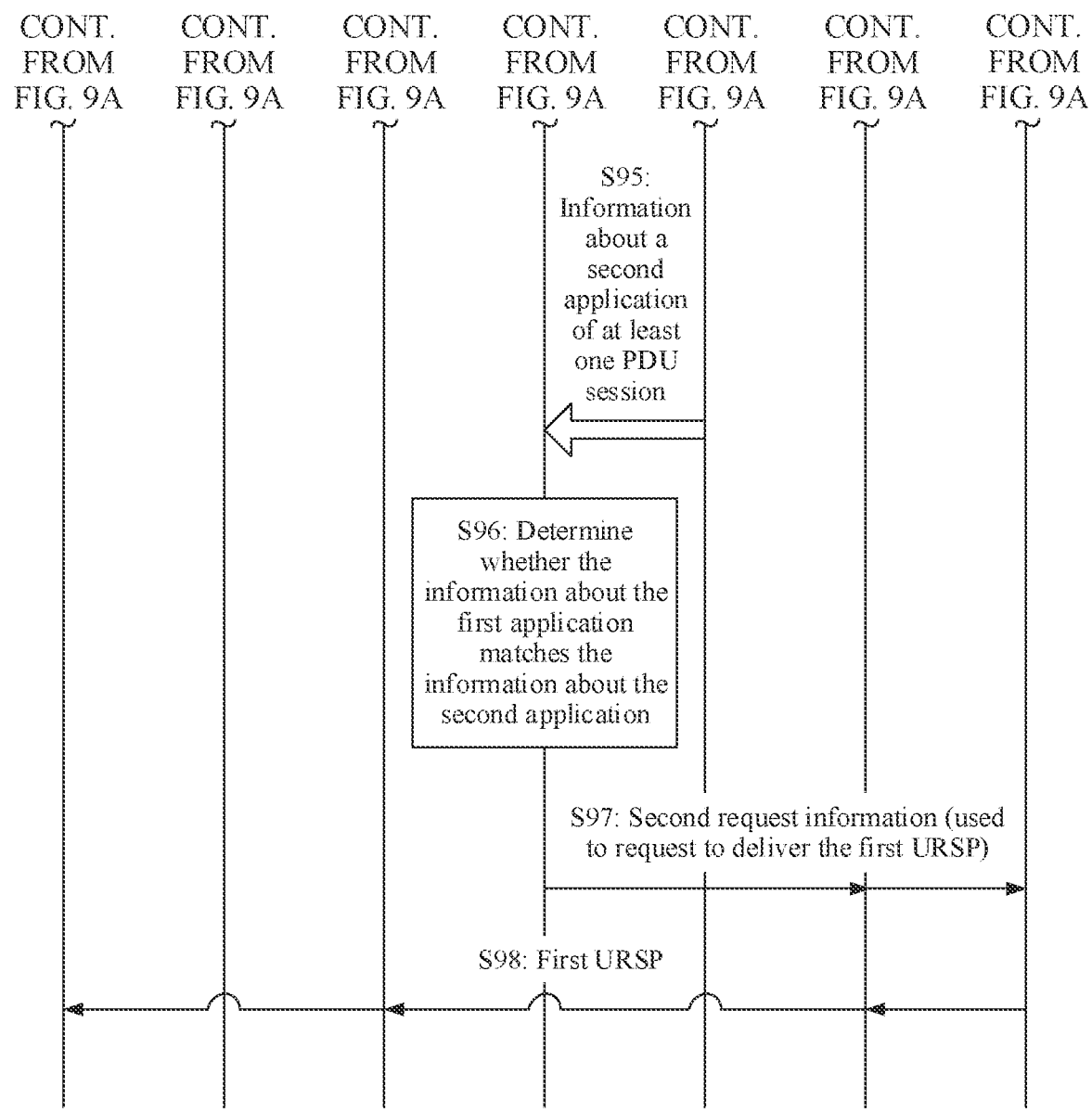

To resolve a same problem, referring to FIG. 9A and FIG. 9B, an embodiment of this application provides a third communication method. A procedure of the method is described as follows.

S91: In a registration procedure of a terminal apparatus, a third network element sends first request information to a first network element, and the first network element receives the first request information from a second network element, where the first request information is used to request to obtain a first URSP, or is used to request to obtain information about a first application of at least one PDU session. The information about the first application is determined based on the first URSP. The first URSP may be understood as a URSP on a network side, that is, a URSP in an AM-PCF. The first URSP may include one specific URSP or include a plurality of URSPs. The first URSP specifies information about an application corresponding to an attribute of the at least one PDU session, that is, specifies the information about the first application of the at least one PDU session.

In an LBO scenario, an SM-PCF in a VPLMN cannot be connected to a UDR in an HPLMN, and a UDM is located in the HPLMN and can communicate with the UDR in the HPLMN. In this case, the UDM may obtain, from the UDR, the first URSP or the information about the first application of the at least one PDU session. Therefore, when the first network element is a UDR, the UDM can also implement a corresponding function of the SM-PCF in the embodiment shown in FIG. 8A and FIG. 8B. In this embodiment, the third network element is, for example, a UDM, and the first network element is, for example, a UDR.

S92: If the UDR sends the first URSP to the UDM, the UDM receives the first URSP; or if the UDR sends the information about the first application to the UDM, the UDM receives the information about the first application.

When the first request information is used to request to obtain the first URSP, the UDR sends the first URSP to the UDM. In this case, the UDM receives the first URSP, and it is considered that the UDM obtains the first URSP. Alternatively, when the first request information is used to request to obtain the information about the first application of the at least one PDU session, the UDR sends the information about the first application to the UDM. In this case, the UDM receives the information about the first application, and it is considered that the UDM obtains the information about the first application.

For example, in the registration procedure of the terminal apparatus, a policy joint establishment (policy association establishment during registration) process in the registration process is performed between an AMF and a PCF. After the process is completed, S91 and S92 may be performed.

S93: The UDM sends the first URSP or the information about the first application to the second network element, and the second network element receives the first URSP or the information about the first application.

For example, the second network element is an SMF or a UPF. In FIG. 9A and FIG. 9B, an example in which second network element is an SMF is used. In addition, if this embodiment is applied to a roaming scenario, the SMF may be an SMF in the VPLMN.

If the UDM receives the first URSP from the UDR in S92, the UDM may directly send the first URSP to the second network element, or the UDM may obtain, based on the first URSP, the information about the first application, and then send the information about the first application to the second network element. If the UDM receives the information about the first application from the UDR in S92, the UDM may directly send the information about the first application to the second network element.

The UDM may send the first URSP or the information about the first application to the SMF in a PDU session establishment process initiated by the terminal apparatus. In this case, it may be considered that the terminal apparatus initiates the PDU session establishment process before S93, as shown in FIG. 9A. For example, the UDM sends the first URSP or the information about the first application to the SMF by using registration/subscription/subscription for updates s) information in the PDU session establishment process.

S94: The SMF disposes an application detection trigger, also referred to as an application detection report trigger, on the UPF.

S95: The UPF sends information about a second application of the at least one PDU session to the SMF, and the SMF receives the information about the second application of the at least one PDU session.

S96: The SMF determines whether the information about the second application of the at least one PDU session matches the information about the first application of the at least one PDU session.

If the UDM sends the first URSP to the SMF in S93, the SMF may obtain, based on the first URSP, the information about the first application of the at least one PDU session.

For S94 to S96, refer to the descriptions of S74 to S76 in the embodiment show s in FIG. 7A and FIG. 7B.

S97: When determining that the information about the second application of the at least one PDU session does not match the information about the first application of the at least one PDU session, the SMF sends second request information to the UDR, and the UDR receives the second request information, where the second request information is used to request the UDR to deliver the first URSP.

In this embodiment, an example in which the SMF verifies whether a URSP of the terminal apparatus is incorrect is used. Similar to the descriptions of S77 in the embodiment shown in FIG. 7B, in this embodiment, the UPF may also perform the verification process. Details are not described again.

The SMF sends the second request information to the UDR by using the UDM. For example, the SMF sends the second request information to the UDM, and the UDM forwards the second request information to the UDR. In this case, the UDR receives, from the UDM, the second request information from the SMF, as shown by two arrows in S97 in FIG. 9B.

S98: The UDR re-delivers the first URSP, and the terminal apparatus receives the first URSP. For example, the UDR sends the first URSP to the UDM, the UDM forwards the first URSP to the AMF, and the AMF forwards the first URSP to the terminal apparatus, as shown by several arrows of S98 in FIG. 9B.

After receiving the new URSP, if the PDU session initiated before S93 has been established, and the terminal apparatus needs to modify, based on the first URSP, a parameter of the PDU session, the terminal apparatus may initiate a PDU session modification procedure; or if the terminal apparatus needs to re-establish a PDU session based on the first URSP, the terminal apparatus may initiate a PDU session establishment procedure. In addition, if the PDU session initiated before S93 has been established, and the terminal apparatus needs to release the PDU session, the terminal apparatus may initiate a PDU session release procedure. For the PDU session establishment procedure, the PDU session modification procedure, the PDU session release procedure, and the like, refer to an existing standard procedure. Details are not described.

It can be learned that in this embodiment of this application, the UDM may obtain the first URSP from the UDR, or obtain the information about the first application of the at least one PDU session, so that the SMF or the UPF can verify whether the URSP used by the terminal apparatus is correct. If the URSP used by the terminal apparatus is incorrect, the AM-PCF or the UDR may be requested to re-deliver a correct URSP to the terminal apparatus, so that the URSP used by the terminal apparatus is consistent with the URSP on the network side, thereby ensuring that the PDU session is normally performed.

In this embodiment, the first URSP includes, for example, at least one of UE policy status information or a PSI list, and policy content corresponding to the first URSP.

The following describes an apparatus provided in the embodiments of this application with reference to the accompanying drawings.

Figure 10:
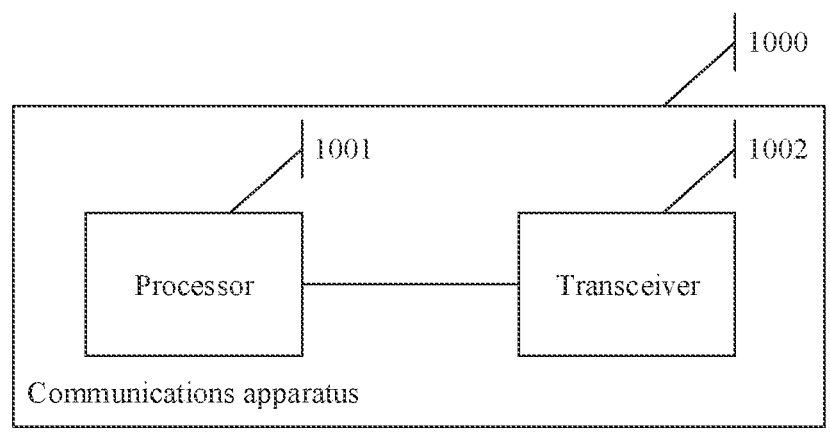
FIG. 10 is a schematic structural diagram of a communications apparatus that can implement a function of a third network element according to an embodiment of this application.

FIG. 10 is a schematic structural diagram of a communications apparatus 1000. The communications apparatus 1000 may implement functions of the third network element in the foregoing descriptions. The communications apparatus 1000 may be the third network element described above, or may be a chip disposed in the third network element described above. The third network element is, for example, an AMF, an SM-PCF, an NEF, or a UDM. The communications apparatus 1000 may include a processor 1001 and a transceiver 1002. The processor 1001 may be configured to perform S73 (for example, when first request information is used to request to obtain a URSP or information about a first application of at least one PDU session, a first network element sends a first URSP to the communications apparatus 1000, and the processor 1001 obtains, based on the first URSP, the information about the first application) in the embodiment shown in FIG. 7A, and/or is configured to support another process of the technology described in this specification. The transceiver 1002 may be configured to perform S72 in the embodiment shown in FIG. 7A, and/or is configured to support another process of the technology described in this specification. Alternatively, the processor 1001 may be configured to perform S83 (for example, when first request information is used to request to obtain a URSP or information about a first application of at least one PDU session, a first network element sends a first URSP to the communications apparatus 1000 and the processor 1001 obtains, based on the first URSP, the information about the first application) in the embodiment shown in FIG. 8A, and/or is configured to support another process of the technology described in this specification. The transceiver 1002 may be configured to perform S82 in the embodiment shown in FIG. 8A, and/or is configured to support another process of the technology described in this specification. Alternatively, the processor 1001 may be configured to perform S93 (for example, if a UDM receives a first URSP from a UDR, the processor 1001 may obtain, based on the first URSP, information about a first application) in the embodiment shown in FIG. 9A, and/or is configured to support another process of the technology described in this specification. The transceiver 1002 may be configured to perform S91, S92, and S93 in the embodiment shown in FIG. 9A and FIG. 9B, and/or is configured to support another process of the technology described in this specification.

For example, the processor 1001 is configured to obtain information about a first application of at least one PDU session, where the information about the first application is determined based on a first URSP.

The transceiver 1002 is configured to send the information about the first application to a second network element, where the information about the first application is used to verify whether information about a second application of the at least one PDU session matches the information about the first application, and the information about the second application is information about an application to which a data packet in the at least one PDU session belongs.

All related content of the steps in the foregoing method embodiments may be cited in function descriptions of a corresponding function module, and details are not described herein again.

Figure 11:
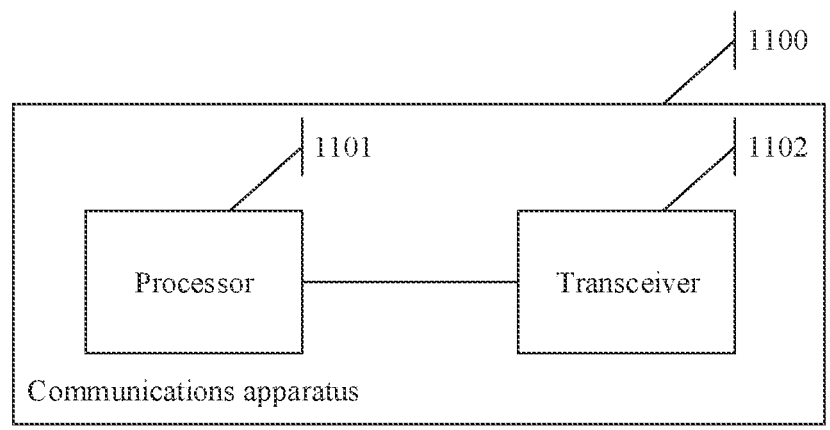
FIG. 11 is a schematic structural diagram of a communications apparatus that can implement a function of a second network element according to an embodiment of this application.

FIG. 11 is a schematic structural diagram of a communications apparatus 1100. The communications apparatus 1100 may implement functions of the second network element in the foregoing descriptions. The communications apparatus 1100 may be the second network element described above, or may be a chip disposed in the second network element described above. The second network element is, for example, an SMF or a UPF. The communications apparatus 1100 may include a processor 1101 and a transceiver 1102. The processor 1101 may be configured to perform S76 in the embodiment shown in FIG. 7B, and/or is configured to support another process of the technology described in this specification. The transceiver 1102 may be configured to perform S72, S73, S74 (for example, the transceiver 1102 sends third request information to a UPF, where the third request information is used to indicate the UPF to determine information about an application to which a data packet in at least one PDU session belongs), S75, and S77 in the embodiment shown in FIG. 7A and FIG. 7B, and/or is configured to support another process of the technology described in this specification. Alternatively, the processor 1101 may be configured to perform S86 in the embodiment shown in FIG. 8B, and/or is configured to support another process of the technology described in this specification. The transceiver 1102 may be configured to perform S82, S83, S84 (for example, the transceiver 1002 sends third request information to a UPF, where the third request information is used to indicate the UPF to determine information about an application to which a data packet in at least one PDU session belongs), S85, and S87 in the embodiment shown in FIG. 8A and FIG. 8B, and/or is configured to support another process of the technology described in this specification. Alternatively, the processor 1101 may be configured to perform S96 in the embodiment shown in FIG. 9B, and/or is configured to support another process of the technology described in this specification. The transceiver 1102 may be configured to perform S93, S94 (for example, the transceiver 1102 sends third request information to a UPF, where the third request information is used to indicate the UPF to determine information about an application to which a data packet in at least one PDU session belongs), S95, and S97 in the embodiment shown in FIG. 9A and FIG. 9B, and/or is configured to support another process of the technology described in this specification.

For example, the transceiver 1102 is configured to receive information about a first application of at least one PDU session, where the information about the first application is determined based on a first URSP.

The processor 1101 is configured to determine whether information about a second application of the at least one PDU session matches the information about the first application, where the information about the second application is information about an application to which a data packet in the at least one PDU session belongs.

The transceiver 1102 is further configured to send second request information to a first network element when the processor 1101 determines that the information about the second application does not match the information about the first application, where the second request information is used to request the first network element to deliver the first URSP.

All related content of the steps in the foregoing method embodiments may be cited in function descriptions of a corresponding function module, and details are not described herein again.

Figure 12:
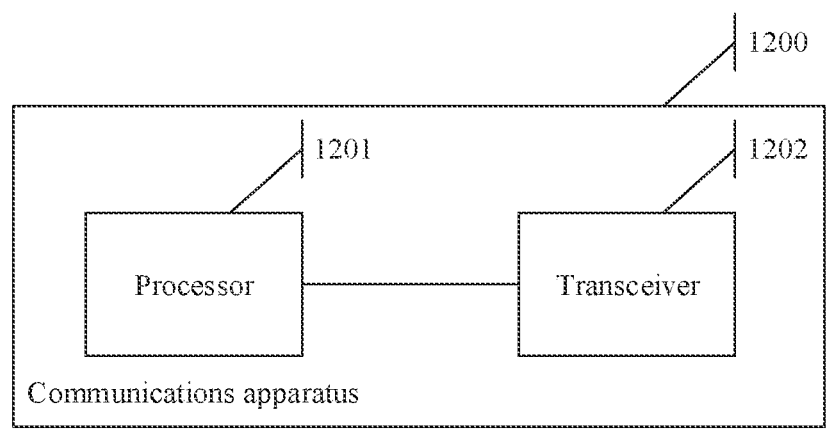
FIG. 12 is a schematic structural diagram of a communications apparatus that can implement a function of a first network element according to an embodiment of this application.

FIG. 12 is a schematic structural diagram of a communications apparatus 1200. The communications apparatus 1200 may implement functions of the first network element in the foregoing descriptions. The communications apparatus 1200 may be the first network element described above, or may be a chip disposed in the first network element described above. The second network element is, for example, an AM-PCF or a UDR. The communications apparatus 1200 may include a processor 1201 and a transceiver 1202. The processor 1201 may be configured to perform the step of obtaining, based on first request information, a first URSP or information about a first application, the step of determining, based on second request information, to deliver a first URSP in the embodiment shown in FIG. 7A and FIG. 7B, and/or is configured to support another process of the technology described in this specification. The transceiver 1002 may be configured to perform S72, S73, S77, and S78 in the embodiment shown in FIG. 7A and FIG. 7B, and/or is configured to support another process of the technology described in this specification. Alternatively, the processor 1201 may be configured to perform the step of obtaining, based on first request information, a first URSP or information about a first application, the step of determining, based on second request information, to deliver a first URSP in the embodiment shown in FIG. 8A and FIG. 8B, and/or is configured to support another process of the technology described in this specification. The transceiver 1002 may be configured to perform S82, S83, S87, and S88 in the embodiment shown in FIG. 8A and FIG. 8B, and/or is configured to support another process of the technology described in this specification. Alternatively, the processor 1001 may be configured to perform the step of obtaining, based on first request information, a first URSP or information about a first application, the step of determining, based on second request information, to deliver a first URSP in the embodiment shown in FIG. 9A and FIG. 9B, and/or is configured to support another process of the technology described in this specification. The transceiver 1002 may be configured to perform S91, S92, S97, and S98 in the embodiment shown in FIG. 9A and FIG. 9B, and/or is configured to support another process of the technology described in this specification.

For example, the transceiver 1202 is configured to receive first request information sent by a third network element, where the first request information is used to request to obtain a first URSP, or is used to request to obtain information about a first application of at least one PDU session, and the information about the first application is determined based on the first URSP.

The transceiver 1202 is further configured to send the first URSP to the third network element when the processor 1201 determines that the first request information is used to request to obtain the first URSP; or send the information about the first application to the third network element when the processor 1201 determines that the first request information is used to request to obtain the information about the first application.

All related content of the steps in the foregoing method embodiments may be cited in function descriptions of a corresponding function module, and details are not described herein again.

Figure 13A:
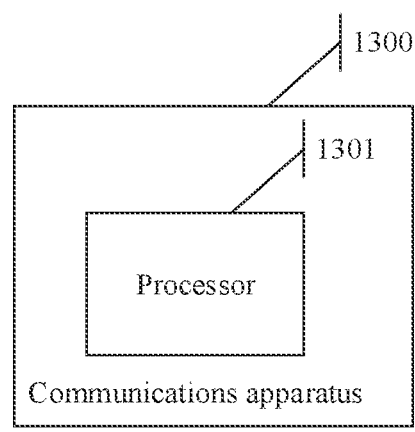
FIG. 13A and FIG. 13B are two schematic structural diagrams of a communications apparatus according to embodiments of this application.

In a simple embodiment, a person skilled in the art may figure out that the communications apparatus 1000, the communications apparatus 1100, or the communications apparatus 1200 may be further implemented by using a structure of a communications apparatus 1300 shown in FIG. 13A. The communications apparatus 1300 may implement functions of the first network element, the second network element, or the third network element in the foregoing descriptions. The communications apparatus 1300 may include a processor 1301.

When the communications apparatus 1300 is configured to implement a function of the third network element in the foregoing descriptions, the processor 1301 may be configured to perform S73 (for example, when first request information is used to request to obtain a URSP or information about a first application of at least one PDU session, a first network element sends a first URSP to the communications apparatus 1000, and the processor 1001 obtains, based on the first URSP, the information about the first application) in the embodiment shown in FIG. 7A, and/or is configured to support another process of the technology described in this specification; alternatively, when the communications apparatus 1300 is configured to implement a function of the third network element in the foregoing descriptions, the processor 1301 may be configured to perform S83 (for example, when first request information is used to request to obtain a URSP or information about a first application of at least one PDU session, a first network element sends a first URSP to the communications apparatus 1000, and the processor 1001 obtains, based on the first URSP, the information about the first application) in the embodiment shown in FIG. 8A, and/or is configured to support another process of the technology described in this specification; alternatively, when the communications apparatus 1300 is configured to implement a function of the third network element in the foregoing descriptions, the processor 1301 may be configured to perform S93 (for example, if a UDM receives a first URSP from a UDR, the processor 1001 may obtain, based on the first URSP, information about a first application) in the embodiment shown in FIG. 9A, and/or is configured to support another process of the technology described in this specification.

When the communications apparatus 1300 is configured to implement a function of the second network element in the foregoing descriptions, the processor 1301 may be configured to perform S76 in the embodiment shown in FIG. 7B, and/or is configured to support another process of the technology described in this specification; alternatively, when the communications apparatus 1300 is configured to implement a function of the second network element in the foregoing descriptions, the processor 1301 may be configured to perform S86 in the embodiment shown in FIG. 8B, and/or is configured to support another process of the technology described in this specification; alternatively, when the communications apparatus 1300 is configured to implement a function of the second network element in the foregoing descriptions, the processor 1301 may be configured to perform S96 in the embodiment shown in FIG. 9B, and/or is configured to support another process of the technology described in this specification.

When the communications apparatus 1300 is configured to implement a function of the first network element in the foregoing descriptions, the processor 1301 may be configured to perform the step of obtaining, based on first request information, a first URSP or information about a first application, the step of determining, based on second request information, to deliver a first URSP in the embodiment shown in FIG. 7A and FIG. 7B, the embodiment shown in FIG. 8A and FIG. 8B, or the embodiment shown in FIG. 9A and FIG. 9B, and/or is configured to support another process of the technology described in this specification.

The communications apparatus 1300 may be implemented by a field-programmable gate array (FPGA), a dedicated integrated chip (ASIC), a system on chip (SoC), a central processing unit (CPU), a network processor (NP), a digital signal processing circuit (DSP), a micro controller unit (MCU), a programmable logic device (PLD), or another integrated chip. In this case, the communications apparatus 1300 may be disposed in the first network element, the second network element, or the third network element in the embodiments of this application, so that the first network element, the second network element, or the third network element is enabled to implement the method provided in the embodiments of this application.

In an optional implementation, the communications apparatus 1300 may include a transceiver component, configured to communicate with another device.

When the communications apparatus 1300 is configured to implement a function of the third network element in the foregoing descriptions, the transceiver component may be configured to perform S72 in the embodiment shown in FIG. 7A, and/or is configured to support another process of the technology described in this specification alternatively, when the communications apparatus 1300 is configured to implement a function of the third network element in the foregoing descriptions, the transceiver component may be configured to perform S82 in the embodiment shown in FIG. 8A, and/or is configured to support another process of the technology described in this specification; alternatively, when the communications apparatus 1300 is configured to implement a function of the third network element in the foregoing descriptions, the transceiver component may be configured to perform S91, S92, and S93 in the embodiment shown in FIG. 9A, and/or is configured to support another process of the technology described in this specification.

When the communications apparatus 1300 is configured to implement a function of the second network element in the foregoing descriptions, the transceiver component may be configured to perform S72, S73, S74 (for example, the transceiver component sends third request information to a UPF, where the third request information is used to indicate the UPF to determine information about an application to which a data packet in at least one PDU session belongs), S75, and S77 in the embodiment shown in FIG. 7A and FIG. 7B, and/or is configured to support another process of the technology described in this specification; alternatively, when the communications apparatus 1300 is configured to implement a function of the second network element in the foregoing descriptions, the transceiver component may be configured to perform S82, S83, S84 (for example, the transceiver component sends third request information to a UPF, where the third request information is used to indicate the UPF to determine information about an application to which a data packet in at least one PDU session belongs), S85, and S87 in the embodiment shown in FIG. 8A and FIG. 8B, and/or is configured to support another process of the technology described in this specification; alternatively, when the communications apparatus 1300 is configured to implement a function of the second network element in the foregoing descriptions, the transceiver component may be configured to perform S93, S94 (for example, the transceiver component sends third request information to a UPF, where the third request information is used to indicate the UPF to determine information about an application to which a data packet in at least one PDU session belongs), S95, and S97 in the embodiment shown in FIG. 9A and FIG. 9B, and/or is configured to support another process of the technology described in this specification.

When the communications apparatus 1300 is configured to implement a function of the first network element in the foregoing descriptions, the transceiver component may be configured to perform S72, S73, S77, and S78 in the embodiment shown in FIG. 7A and FIG. 7B, and/or is configured to support another process of the technology described in this specification; alternatively, when the communications apparatus 1300 is configured to implement a function of the first network element in the foregoing descriptions, the transceiver component may be configured to perform S82, S83, S87, and S88 in the embodiment shown in FIG. 8A and FIG. 8B, and/or is configured to support another process of the technology described in this specification; alternatively, when the communications apparatus 1300 is configured to implement a function of the first network element in the foregoing descriptions, the transceiver component may be configured to perform S91, S92, S97, and S98 in the embodiment shown in FIG. 9A and FIG. 9B, and/or is configured to support another process of the technology described in this specification.

Figure 13B:
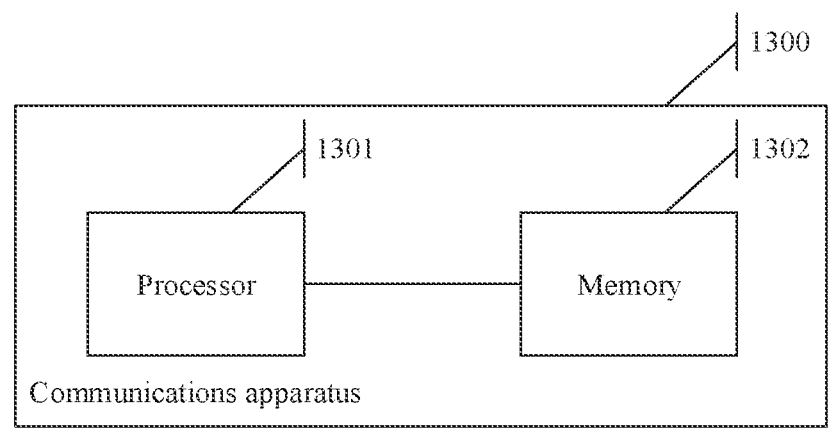

In an optional implementation, the communications apparatus 1300 may further include a memory 1302. Referring to FIG. 13B, the memory 1302 is configured to store a computer program or an instruction, and the processor 1301 is configured to decode and execute the computer program or the instruction. It should be understood that the computer program or the instruction may include a function program of the first network element, the second network element, or the third network element. When the function program of the first network element is decoded and executed by the processor 1001, the first network element may implement a function of the first network element in the method provided in the embodiment shown in FIG. 7A and FIG. 7B, the embodiment shown in FIG. 8A and FIG. 8B, or the embodiment shown in FIG. 9A and FIG. 9B. When the function program of the second network element is decoded and executed by the processor 1001, the second network element may implement a function of the second network element in the method provided in the embodiment shown in FIG. 7A and FIG. 7B, the embodiment shown in FIG. 8A and FIG. 8B, or the embodiment shown in FIG. 9A and FIG. 9B. When the function program of the third network element is decoded and executed by the processor 1001, the third network element may implement a function of the third network element in the method provided in the embodiment shown in FIG. 7A and FIG. 7B, the embodiment shown in FIG. 8A and FIG. 8B, or the embodiment shown in FIG. 9A and FIG. 9B.

In another optional implementation, the function program of the first network element, the second network element, or the third network element is stored in an external memory of the communications apparatus 1300, When the function program of the first network element is decoded and executed by the processor 1301, the memory 1302 temporarily stores some or all content of the function program of the first network element. When the function program of the second network element is decoded and executed by the processor 1301, the memory 1302 temporarily stores some or all content of the function program of the second network element. When the function program of the third network element is decoded and executed by the processor 1301, the memory 1302 temporarily stores some or all content of the function program of the third network element.

In another optional implementation, the function program of the first network element, the second network element, or the third network element is set to be stored in the internal memory 1302 of the communications apparatus 1300, When the function program of the first network element is stored in the internal memory 1302 of the communications apparatus 1300, the communications apparatus 1300 may be disposed in the first network element in the embodiments of this application. When the function program of the second network element is stored in the internal memory 1302 of the communications apparatus 1300, the communications apparatus 1300 may be disposed in the second network element in the embodiments of this application. When the function program of the third network element is stored in the internal memory 1302 of the communications apparatus 1300, the communications apparatus 1300 may be disposed in the third network element in the embodiments of this application.

In still another optional implementation, some content of the function program of the first network element is stored in an external memory of the communications apparatus 1300, and other content of the function program of the first network element is stored in the internal memory 1302 of the communications apparatus 1300. Alternatively, some content of the function program of the second network element is stored in an external memory of the communications apparatus 1300, and other content of the function program of the second network element is stored in the internal memory 1302 of the communications apparatus 1300. Alternatively, some content of the function program of the third network element is stored in an external memory of the communications apparatus 1300, and other content of the function program of the third network element is stored in the internal memory 1302 of the communications apparatus 1300.

In the embodiments of this application, the communications apparatus 1000, the communications apparatus 1100, the communications apparatus 1200, and the communications apparatus 1300 are presented in a form in which each function module is divided for each function, or may be presented in a form in which each function module is divided in an integrated manner. The "module" herein may be an ASIC, a processor and a memory that execute one or more software or firmware programs, an integrated logic circuit, and/or another component that can provide the foregoing functions.

In addition, the communications apparatus 1000 provided in the embodiment shown in FIG. 10 may alternatively be implemented in another form. For example, the communications apparatus includes a processing module and a transceiver module. For example, the processing module may be implemented by the processor 1001, and the transceiver module may be implemented by the transceiver 1002, The processing module may be configured to perform S73 (for example, when first request information is used to request to obtain a URSP or information about a first application of at least one PDU session, a first network element sends a first URSP to the communications apparatus, and the processing module obtains, based on the first URSP, the information about the first application) in the embodiment shown in FIG. 7A, and/or is configured to support another process of the technology described in this specification. The transceiver module may be configured to perform S72 in the embodiment shown in FIG. 7A, and/or is configured to support another process of the technology described in this specification. Alternatively, the processing module may be configured to perform S83 (for example, when first request information is used to request to obtain a URSP or information about a first application of at least one PDU session, a first network element sends a first URSP to the communications apparatus, and the processing module obtains, based on the first URSP, the information about the first application) in the embodiment shown in FIG. 8A, and/or is configured to support another process of the technology described in this specification. The transceiver module may be configured to perform S82 in the embodiment shown in FIG. 8A, and/or is configured to support another process of the technology described in this specification. Alternatively, the processing module may be configured to perform S93 (for example, if a UDM receives a first URSP from a UDR, the processing module may obtain, based on the first URSP, information about a first application) in the embodiment shown in FIG. 9A, and/or is configured to support another process of the technology described in this specification. The transceiver module may be configured to perform S91, S92, and S93 in the embodiment shown in FIG. 9A, and/or is configured to support another process of the technology described in this specification.

For example, the processing module is configured to obtain information about a first application of at least one PDU session, where the information about the first application is determined based on a first URSP.

The transceiver module is configured to send the information about the first application to a second network element, where the information about the first application is used to verify whether information about a second application of the at least one PDU session matches the information about the first application, and the information about the second application is information about an application to which a data packet in the at least one PDU session belongs.

All related content of the steps in the foregoing method embodiments may be cited in function descriptions of a corresponding function module, and details are not described herein again.

The communications apparatus 1100 provided in the embodiment shown in FIG. 11 may be alternatively implemented in another form. For example, the communications apparatus includes a processing module and a transceiver module. For example, the processing module may be implemented by the processor 1101, and the transceiver module may be implemented by the transceiver 1102. The processing module may be configured to perform S76 in the embodiment shown in FIG. 7B, and/or is configured to support another process of the technology described in this specification. The transceiver module may be configured to perform S72, S73, S74 (for example, the transceiver module sends third request information to a UPF, where the third request information is used to indicate the UPF to determine information about an application to which a data packet in at least one MU session belongs), S75, and S77 in the embodiment shown in FIG. 7A and FIG. 7B, and/or is configured to support another process of the technology described in this specification. Alternatively, the processing module may be configured to perform S86 in the embodiment shown in FIG. 8B, and/or is configured to support another process of the technology described in this specification. The transceiver module may be configured to perform S82, S83, S84 (for example, the transceiver module sends third request information to a IMF, where the third request information is used to indicate the UPF to determine information about an application to which a data packet in at least one PDU session belongs), S85, and S87 in the embodiment shown in FIG. 8A and FIG. 8B, and/or is configured to support another process of the technology described in this specification. Alternatively, the processing module may be configured to perform S96 in the embodiment shown in FIG. 9B, and/or is configured to support another process of the technology described in this specification. The transceiver module may be configured to perform S93, S94 (for example, the transceiver module sends third request information to a UPF, where the third request information is used to indicate the UPF to determine information about an application to which a data packet in at least one PDU session belongs), S95, and S97 in the embodiment shown in FIG. 9A and FIG. 9B, and/or is configured to support another process of the technology described in this specification.

For example, the transceiver module is configured to receive information about a first application of at least one PDU session, where the information about the first application is determined based on a first URSP.

The processing module is configured to determine whether information about a second application of the at least one PDU session matches the information about the first application, where the information about the second application is information about an application to which a data packet in the at least one PDU session belongs.

The transceiver module is configured to send second request information to a first network element when the processing module determines that the information about the second application does not match the information about the first application, where the second request information is used to request the first network element to deliver the first URSP All related content of the steps in the foregoing method embodiments may be cited in function descriptions of a corresponding function module, and details are not described herein again.

The communications apparatus 1200 provided in the embodiment shown in FIG. 12 may be alternatively implemented in another form. For example, the communications apparatus includes a processing module and a transceiver module. For example, the processing module may be implemented by the processor 1201, and the transceiver module may be implemented by the transceiver 1202. The processing module may be configured to perform the step of obtaining, based on first request information, a first URSP or information about a first application, the step of determining, based on second request information, to deliver a first URSP in the embodiment shown in FIG. 7A and FIG. 7B, and/or is configured to support another process of the technology described in this specification. The transceiver module may be configured to perform S72, S73, S77, and S78 in the embodiment shown in FIG. 7A and FIG. 7B, and/or is configured to support another process of the technology described in this specification. Alternatively, the processing module may be configured to perform the step of obtaining, based on first request information, a first URSP or information about a first application, the step of determining, based on second request information, to deliver a first URSP in the embodiment shown in FIG. 8A and FIG. 8B, and/or is configured to support another process of the technology described in this specification. The transceiver module may be configured to perform S82, S83, S87, and S88 in the embodiment shown in FIG. 8A and FIG. 8B, and/or is configured to support another process of the technology described in this specification. Alternatively, the processing module may be configured to perform the step of obtaining, based on first request information, a first URSP or information about a first application, the step of determining, based on second request information, to deliver a first URSP in the embodiment shown in FIG. 9A and FIG. 9B, and/or is configured to support another process of the technology described in this specification. The transceiver module may be configured to perform S91, S92, S97, and S98 in the embodiment shown in FIG. 9A and FIG. 9B, and/or is configured to support another process of the technology described in this specification.

For example, the transceiver module is configured to receive first request information sent by a third network element, where the first request information is used to request to obtain a first URSP, or is used to request to obtain information about a first application of at least one PDU session, and the information about the first application is determined based on the first URSP.

The transceiver module is further configured to send the first URSP to the third network element when the processing module determines that the first request information is used to request to obtain the first URSP, or send the information about the first application to the third network element when the processing module determines that the first request information is used to request to obtain the information about the first application.

All related content of the steps in the foregoing method embodiments may be cited in function descriptions of a corresponding function module, and details are not described herein again.

The communications apparatus 1000, the communications apparatus 1100, the communications apparatus 1200, and the communications apparatus 1300 provided in the embodiments of this application may be configured to perform the method provided in the embodiment shown in FIG. 7A and FIG. 7B, the embodiment shown in FIG. 8A and FIG. 8B, or the embodiment shown in FIG. 9A and FIG. 9B. Therefore, for a technical effect that can be achieved by the method, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

Substantially, a person skilled in the art can make various modifications and variations to embodiments of this application without departing from the spirit and scope of this application. In this way, this application is intended to cover these modifications and variations provided that they fall within the scope of the following claims and their equivalent technologies.

What is claimed is:

1. A communication method, comprising:
    obtaining, by a third network element, information about a first application of at least one packet data unit (PDU) session, wherein the information about the first application is determined based on a first user equipment route selection policy (URSP);
    sending, by the third network element, the information about the first application to a second network element;
    receiving, by the second network element, the information about the first application; and
    verifying, by the second network element, whether information about a second application of the at least one PDU session matches the information about the first application, wherein the second application of the at least one PDU session is related to a URSP used by a terminal apparatus and the first URSP that determines the information about first application is obtained from network side, and wherein the information about the second application is information about an application to which a data packet in the at least one PDU session belongs.

2. The method according to claim 1, wherein the obtaining information about a first application of at least one PDU session comprises:
    sending, by the third network element, first request information to the first network element, wherein the first request information is used to request to obtain the information about the first application, and receiving, by the third network element, the information about the first application; or
    sending, by the third network element, first request information to the first network element, wherein the first request information is used to request to obtain the first URSP, receiving, by the third network element, the first URSP, and obtaining, based on the first URSP, the information about the first application.

3. The method according to claim 2, wherein the first request information comprises identification information of a first PDU session, and the at least one PDU session is the first PDU session.

4. A communications method, comprising:
    receiving information about a first application of at least one packet data unit (PDU) session, wherein the information about the first application is determined based on a first user equipment route selection policy (URSP);
    determining whether information about a second application of the at least one PDU session matches the information about the first application, wherein the second application of the at least one PDU session is related to a URSP used by a terminal apparatus and the first URSP that determines the information about first application is obtained from network side, and wherein the information about the second application is information about an application to which a data packet in the at least one PDU session belongs; and
    sending first request information to the first network element in response to determining that the information about the second application does not match the information about the first application, wherein the first request information is used to request the first network element to deliver the first URSP.

5. The method according to claim 4, wherein the method further comprises:
    sending second request information to the first network element, wherein the second request information is used to:
    request to obtain the information about the first application; or
    request to obtain the first URSP.

6. The method according to claim 4, wherein the method further comprises:
sending third request information to a user plane function (UPF), wherein the third request information is used to indicate the UPF to determine the information about the application to which the data packet in the at least one PDU session belongs; and
receiving the information that is about the second application and that is sent by the UPF.

7. The method according to claim 4, wherein the method further comprises:
detecting the application to which the data packet transmitted in the at least one PDU session belongs to obtain the information about the second application.

8. The method according to claim 4, wherein the sending first request information to the first network element comprises:
sending the first request information to an access and mobility management function (AMF) to forward the first request information to the first network element by using the AMF; or
sending the first request information to a first policy control function (PCF) to forward the first request information to the first network element by using the first PCF, wherein the first PCF is a PCF connected to a session management function SMF.

9. The method according to claim 4, wherein the first network element is a second PCF or a unified data repository (UDR), and the second PCF is a PCF used for access and mobility management (AM) policy control.

10. A communications method, comprising:
receiving first request information sent by a second network element, wherein the first request information is used to request to obtain a first user equipment route selection policy (URSP) or to request to obtain information about a first application of at least one packet data unit (PDU) session, and the information about the first application is determined based on the first URSP, wherein the first application or the first URSP is used to verify whether information about a second application of the at least one PDU session matches the information about the first application, and wherein the second application of the at least one PDU session is related to a URSP used by a terminal apparatus; and
sending the first URSP to the second network element when the first request information is used to request to obtain the first URSP; or
sending the information about the first application to the second network element when the first request information is used to request to obtain the information about the first application.

11. The method according to claim 10, wherein the first request information further carries identification information of a first PDU session; and
the first request information is used to request to obtain the first URSP used to determine information about a first application of the first PDU session; or
the first request information is used to request to obtain information about a first application of the first PDU session,
wherein the information about the first application comprises the information about the first application of the first PDU session.

12. The method according to claim 10, wherein the method further comprises:
receiving second request information sent by the third network element, wherein the second request information is used to request to deliver the first URSP; and
sending the first URSP.

13. The method according to claim 10, wherein the method further comprises:
receiving, by the second network element, the information about the first application; and
verifying, by the second network element, whether information about a second application of the at least one PDU session matches the information about the first application, wherein the second application of the at least one PDU session is related to a URSP used by a terminal apparatus and the first URSP that determines the information about first application is obtained from network side, and wherein the information about the second application is information about an application to which a data packet in the at least one PDU session belongs.

14. A chip system, wherein the chip system comprises:
at least one processor, configured to invoke an instruction, wherein invoking the instruction causes a communications device on which the chip system is installed to:
obtain information about a first application of at least one packet data unit (PDU) session, wherein the information about the first application is determined based on a first user equipment route selection policy (URSP); and
send the information about the first application to a second network element, wherein the information about the first application is used to verify whether information about a second application of the at least one PDU session matches the information about the first application, the second application of the at least one PDU session is related to a URSP used by a terminal apparatus, the first URSP that determines the information about the first application is obtained from a first network element, and the information about the second application is information about an application to which a data packet in the at least one PDU session belongs.

15. The chip system according to claim 14, wherein invoking the instruction causes the communications device on which the chip system is installed to:
send first request information to the first network element, wherein the first request information is used to request to obtain the information about the first application, and receiving the information about the first application; or
send first request information to the first network element, wherein the first request information is used to request to obtain the first URSP, receiving the first URSP, and obtaining, based on the first URSP, the information about the first application.

16. The chip system according to claim 15, wherein the first request information comprises identification information of a first PDU session, and the at least one PDU session is the first PDU session.

* * * * *